(12) United States Patent
Trost et al.

(10) Patent No.: US 11,785,040 B2
(45) Date of Patent: *Oct. 10, 2023

(54) SYSTEMS AND METHODS FOR CYBER SECURITY ALERT TRIAGE

(71) Applicant: Capital One Services, LLC, McLean, VA (US)

(72) Inventors: Jason Trost, Atlanta, GA (US); Brandon Stoy, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/512,882

(22) Filed: Oct. 28, 2021

(65) Prior Publication Data

US 2022/0053016 A1 Feb. 17, 2022

Related U.S. Application Data

(63) Continuation of application No. 16/666,083, filed on Oct. 28, 2019, now Pat. No. 11,165,815.

(51) Int. Cl.
*H04L 9/40* (2022.01)
*G06F 16/28* (2019.01)
*G06F 21/55* (2013.01)

(52) U.S. Cl.
CPC ........ *H04L 63/1441* (2013.01); *G06F 16/285* (2019.01); *G06F 21/552* (2013.01); *G06F 21/554* (2013.01); *H04L 63/1408* (2013.01); *H04L 63/1416* (2013.01); *H04L 63/1425* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 6,996,843 B1 * | 2/2006 | Moran | H04L 63/1408 706/45 |
| 7,774,363 B2 * | 8/2010 | Lim | G06F 21/316 707/781 |
| 7,996,374 B1 * | 8/2011 | Jones | H04L 63/20 707/694 |
| 8,966,036 B1 | 2/2015 | Asgekar et al. | |
| 9,385,993 B1 | 7/2016 | Kulp | |

(Continued)

*Primary Examiner* — Michael W Chao
(74) *Attorney, Agent, or Firm* — Sterne, Kessler, Goldstein & Fox P.L.L.C.

(57) ABSTRACT

The present disclosure is directed to systems, apparatuses and methods for mitigating cyber-attacks. For example, the method includes receiving, from one or more network devices tracking activity on a network, one or more data streams associated with a respective one of the one or more network devices, identifying a security alert from the one or more data streams, the security alert including metadata context describing the network device from the one or more network devices that originated the security alert, analyzing the metadata context to generate a metadata context score. When the security alert is determined to be a security threat event, classifying a type of the security threat event based on the related activity score and the metadata context, and outputting a recommended mitigation course of action based on the classified type of the security threat event.

20 Claims, 16 Drawing Sheets

(56) References Cited

U.S. PATENT DOCUMENTS

| | | | |
|---|---|---|---|
| 9,537,880 B1 | 1/2017 | Jones et al. | |
| 9,635,049 B1 * | 4/2017 | Oprea | H04L 63/145 |
| 9,753,796 B2 | 9/2017 | Mahaffey et al. | |
| 9,842,220 B1 | 12/2017 | Brisebois et al. | |
| 9,967,274 B2 | 5/2018 | Corrales et al. | |
| 10,063,373 B2 | 8/2018 | Schutz et al. | |
| 10,104,100 B1 | 10/2018 | Bogorad | |
| 10,104,102 B1 | 10/2018 | Neumann | |
| 10,270,788 B2 | 4/2019 | Faigon et al. | |
| 10,581,886 B1 | 3/2020 | Mehr | |
| 10,673,880 B1 | 6/2020 | Pratt et al. | |
| 10,708,294 B2 | 7/2020 | Northway, Jr. et al. | |
| 10,721,239 B2 | 7/2020 | Koottayi et al. | |
| 10,757,122 B2 | 8/2020 | Vasudevan et al. | |
| 10,841,339 B2 | 11/2020 | Ray et al. | |
| 10,938,845 B2 | 3/2021 | Elsner et al. | |
| 11,558,408 B2 * | 1/2023 | Eisenkot | G06F 21/316 |
| 11,575,693 B1 * | 2/2023 | Muddu | G06F 40/134 |
| 11,606,384 B2 * | 3/2023 | Merza | A61G 17/0073 |
| 11,611,574 B2 * | 3/2023 | Rajasekharan | H04W 12/122 |
| 11,637,844 B2 * | 4/2023 | Shenoy | H04W 12/67 |
| | | | 726/23 |
| 2006/0242705 A1 | 10/2006 | Sadhasivam et al. | |
| 2008/0295172 A1 | 11/2008 | Bohacek | |
| 2009/0025084 A1 * | 1/2009 | Siourthas | G06Q 20/405 |
| | | | 726/25 |
| 2014/0090056 A1 * | 3/2014 | Manadhata | H04L 63/1416 |
| | | | 726/22 |
| 2014/0165140 A1 | 6/2014 | Singla et al. | |
| 2015/0106926 A1 | 4/2015 | Basavapatna et al. | |
| 2015/0350232 A1 | 12/2015 | Liu et al. | |
| 2016/0014147 A1 * | 1/2016 | Zoldi | H04L 63/1433 |
| | | | 726/23 |
| 2016/0112287 A1 | 4/2016 | Farmer et al. | |
| 2016/0164918 A1 | 6/2016 | Satish et al. | |
| 2016/0191559 A1 | 6/2016 | Mhatre et al. | |
| 2016/0267408 A1 | 9/2016 | Singh et al. | |
| 2017/0046374 A1 | 2/2017 | Fletcher et al. | |
| 2017/0063897 A1 * | 3/2017 | Muddu | G06F 3/04842 |
| 2017/0093902 A1 | 3/2017 | Roundy et al. | |
| 2017/0279835 A1 | 9/2017 | Di Pietro et al. | |
| 2017/0339178 A1 | 11/2017 | Mahaffey et al. | |
| 2018/0004948 A1 * | 1/2018 | Martin | H04L 63/1425 |
| 2018/0027006 A1 | 1/2018 | Zimmermann et al. | |
| 2018/0139229 A1 | 5/2018 | Osterweil et al. | |
| 2018/0152471 A1 * | 5/2018 | Jakobsson | G06Q 50/01 |
| 2018/0219894 A1 | 8/2018 | Crabtree et al. | |
| 2018/0316727 A1 | 11/2018 | Tsironis | |
| 2019/0104137 A1 * | 4/2019 | Hailpern | H04L 63/1408 |
| 2019/0173735 A1 | 6/2019 | Wiacek | |
| 2019/0205511 A1 | 7/2019 | Zhan et al. | |
| 2019/0222589 A1 | 7/2019 | Kislitsin et al. | |
| 2019/0260794 A1 | 8/2019 | Woodford et al. | |
| 2020/0076837 A1 | 3/2020 | Ladnai et al. | |
| 2020/0366700 A1 * | 11/2020 | Prokop | G06Q 50/265 |
| 2020/0382538 A1 | 12/2020 | Feezell et al. | |
| 2021/0014252 A1 * | 1/2021 | Usher | H04L 63/1416 |
| 2021/0090816 A1 | 3/2021 | Ibrahim et al. | |
| 2021/0105294 A1 | 4/2021 | Kruse et al. | |
| 2021/0126938 A1 | 4/2021 | Trost et al. | |

* cited by examiner

SYSTEMS AND METHODS FOR CYBER SECURITY ALERT TRIAGE

CROSS-REFERENCE TO RELATED APPLICATIONS

The present application claims priority and is a continuation application of U.S. patent application Ser. No. 16/666,083 filed on Oct. 28, 2019, and titled "Systems and Methods for Cyber Security Alert Triage," which is incorporated herein by reference.

BACKGROUND

The present disclosure relates to the field of device monitoring and more particularly, to systems and techniques for gathering data across a large-scale of computing devices, evaluating the data, and providing the appropriate response.

Computing devices, especially mobile communications devices, are becoming increasingly ubiquitous. People can be found using their computing devices in their homes and offices, at the airport, in coffee shops and libraries, and many other places. Mobile apps and web apps are used for both personal and business purposes. People use their computing devices for tasks as diverse and varied as socializing, entertainment, business productivity, checking the weather, reading the news, managing their finances, shopping, making appointments with their doctor, checking their business and personal e-mail, and producing work-related reports and analysis—just to name a few examples.

The rise and ubiquity of such devices has been accompanied by a rise in malicious software or malware (e.g., computer viruses, ransomware, worms, trojan horses, rootkits, keyloggers, dialers, spyware, adware, malicious browser helper objects (BHOs), or rogue security software), device robberies, information and identity theft, snooping, eavesdropping, and other unsavory acts. Users have seen their bank accounts emptied, identities stolen, and personal health information improperly accessed. Corporations have seen their intellectual property stolen, trade secrets misappropriated, and so forth. There can be defects or bugs in the device software, hardware, or both. Such defects can produce incorrect or unexpected results, or unintended behavior. Moreover, security operation centers (SOCs) have to monitor enterprise and production networks for security threats and take action on true security incidents. To do this effectively, most SOCs utilize hundreds of rules/detectors to identify threats and produce alerts, but often, these rules are not 100% accurate and result in some non-negligible number of false alarms which consume resources to investigate.

Human operators need to sift through the alerts to determine which are false alarms and which are genuine security threats. The data needed to determine whether the alerts represent genuine security threats may be distributed through many systems, requiring that the operator review many log files, which can be time consuming and introduce opportunity for human error.

Accordingly, there is a continuing need to develop improved systems and techniques for monitoring computing device activity, quickly and accurately identifying threats, and providing the requisite response.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for identifying, tracking, and addressing cyber-security threats.

As described above, existing systems generate an excessive amount of false alarms that human operators must spend resources to investigate. Embodiments disclosed herein deal with this by expediting a triage operation when encountering cyber-attacks. This may be achieved in three different manners. Initially, the disclosed systems may be configured to sort through alerts and determine which alerts are true alerts representing a security threat, and which alerts are false positives or business as usual alerts. This is done through the metadata correlation activity between metadata of a received alert and metadata of related events, as will be discussed herein further.

Moreover, once an alert is generated, the system will gather all relevant "signal" events (more details provided later) as well as relevant enrichment data. Together, the alert, signals, and enrichment data are sent to a machine learning model that provides both a numerical score and a recommended next action for the alert. The score conveys how confident the system is in the next action and the next action is meant to help the analyst understand what they should do (e.g. "Close as Benign", "Escalate to Incident Response", "Close as Mitigated", etc.). The alert, signals, numeric score, and recommendation are all rendered to a security operations command/center (SOC) analyst in a Case Management tool using various appropriate visualizations, including an event timeline. The renderings are designed to provide the analyst with all the context needed to make a decision and to obviate the need for the analyst to go searching through the raw event logs in order to manually find evidence of suspicious activity.

Figure 11:
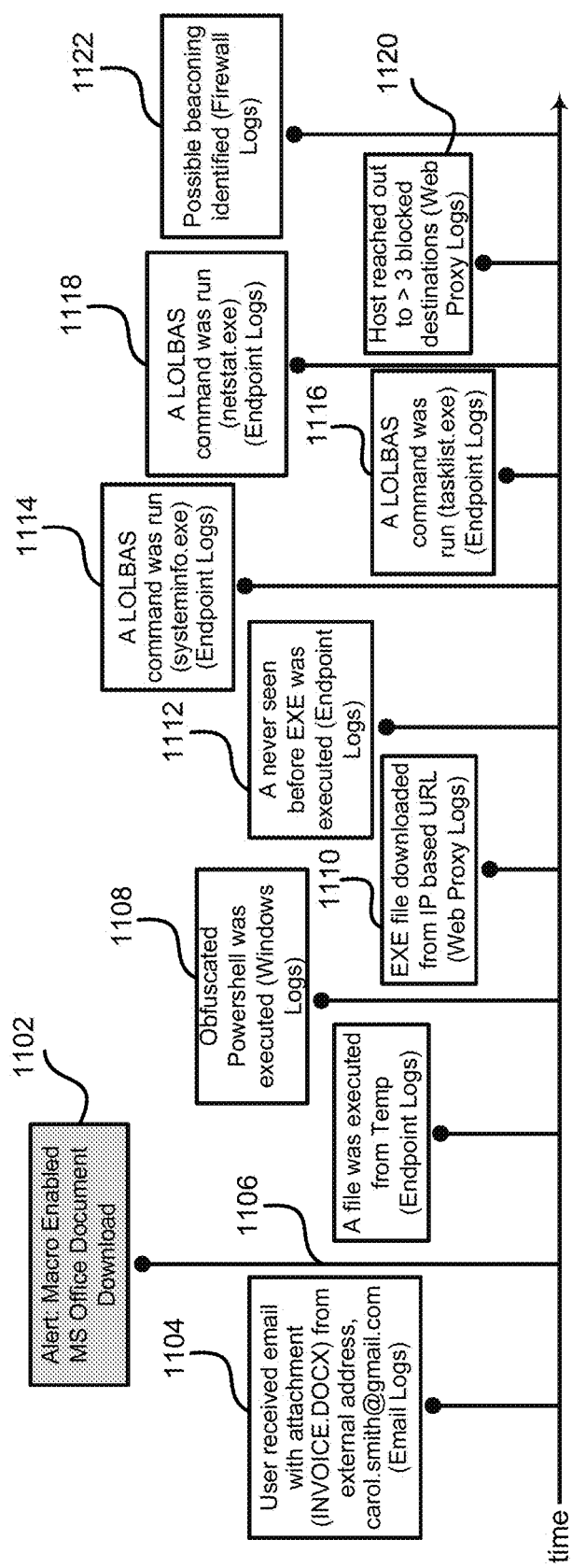
FIG. 11 illustrates a signal plot of signals that are correlated with the alert event to produce an alert and related activities mapping, according to some embodiments.

Moreover, the visual representation also alerts the SOC analyst of the potential breaches associated with the event. For example, as illustrated in FIG. 11 for example, executing a never seen before executable alone may not rise to the level of a malicious activity. However, together with the alert and the other related events, a SOC analyst can immediately determine the nature of the attack and what needs to be done to address it.

Additionally, the disclosed systems may map each activity to a related tactic and technique, which allows a SOC analyst to identify what the end goal of the malicious attack is. In this regard, the disclosed systems may also provide a tactic/technique analysis report and a recommended response to counter the attack. This solution may be output on a graphical user interface (GUI) along with other visible representations of the attack and related activities as will be further described herein.

These steps enable the expedited analysis of and response to malicious attacks on a given network. Moreover, the GUI supported by the disclosed systems may display a variety of outputs all designed to allow a SOC analyst to better understand the problem at hand, and also how to best tackle the problem. The visual representation of the threat event, the related events, the classification and the tactic/technique representation greatly improve a SOC analyst's ability to solve the problem of identifying and countering network security threats.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

Figure 1:
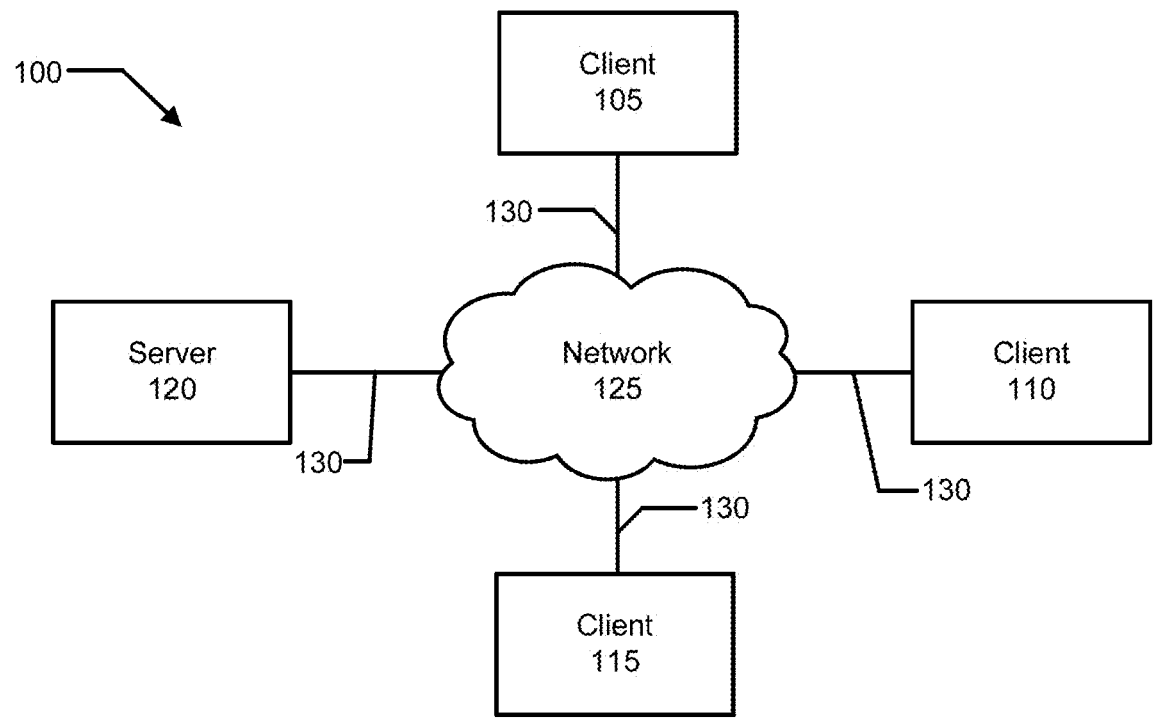
FIG. 1 is a simplified block diagram of a distributed computer network 100 incorporating a specific embodiment of a system for distributed monitoring, evaluation, and response for multiple devices, according to some embodiments.

FIG. 1 is a simplified block diagram of a distributed computer network 100 incorporating a specific embodiment of a system for distributed monitoring, evaluation, and response for multiple devices. Computer network 100 may include a number of client systems 105, 110, and 115, and a server system 120 coupled to a communication network 125 via a plurality of communication links 130. Communication network 125 provides a mechanism for allowing the various components of distributed network 100 to communicate and exchange information with each other.

Communication network 125 may itself be comprised of many interconnected computer systems and communication links. Communication links 130 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, Internet telephony, IP telephony, digital voice, voice over broadband (VoBB), broadband telephony, Voice over IP (VoIP), public switched telephone network (PSTN), and others. While in one embodiment, communication network 125 is the Internet, in other embodiments, communication network 125 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment and does not limit the scope of the systems and methods as recited in the claims. One of ordinary skill in the art would recognize other variations, modifications, and alternatives. For example, more than one server system 120 may be connected to communication network 125. As another example, a number of client systems 105, 110, and 115 may be coupled to communication network 125 via an access provider (not shown) or via some other server system.

Client systems 105, 110, and 115 typically request information from a server system which provides the information. Server systems by definition typically have more computing and storage capacity than client systems. However, a particular computer system may act as both a client or a server depending on whether the computer system is requesting or providing information. Aspects of the system may be embodied using a client-server environment or a cloud computing environment.

Server 120 is responsible for receiving information requests from client systems 105, 110, and 115, performing processing required to satisfy the requests, and for forwarding the results corresponding to the requests back to the requesting client system. The processing required to satisfy the request may be performed by server system 120 or may alternatively be delegated to other servers connected to communication network 125.

Client systems 105, 110, and 115 enable users to access and query information or applications stored by server system 120. A client system may be a computing device. Some example client systems include desktop computers, portable electronic devices (e.g., mobile communications devices, smartphones, tablet computers, laptops) such as the Samsung Galaxy Tab®, Google Nexus devices, Amazon Kindle®, Kindle Fire®, Apple iPhone®, the Apple iPad®, Microsoft Surface®, the Palm Pre™, or any device running the Apple iOS™ Android™ OS, Google Chrome OS, Symbian OS®, Windows Mobile® OS, Windows Phone, BlackBerry OS, Embedded Linux, webOS, Palm OS® or Palm Web OS™.

In a specific embodiment, a "web browser" application executing on a client system enables users to select, access, retrieve, or query information and/or applications stored by server system 120. Examples of web browsers include the Android browser provided by Google, the Safari® browser provided by Apple, Amazon Silk® provided by Amazon, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others (e.g., Google Chrome).

In another embodiment, server system 120 may also monitor the activities of client systems 105, 110, and 115 and identify security breaches or alerts that are triggered by irregular activities or activities tracked and sent to the server by network monitoring devices (not shown). Additionally, or in the alternative, any one of the client systems 105, 110, and 115 may itself be a network monitoring device as will be further described herein.

Figure 2:
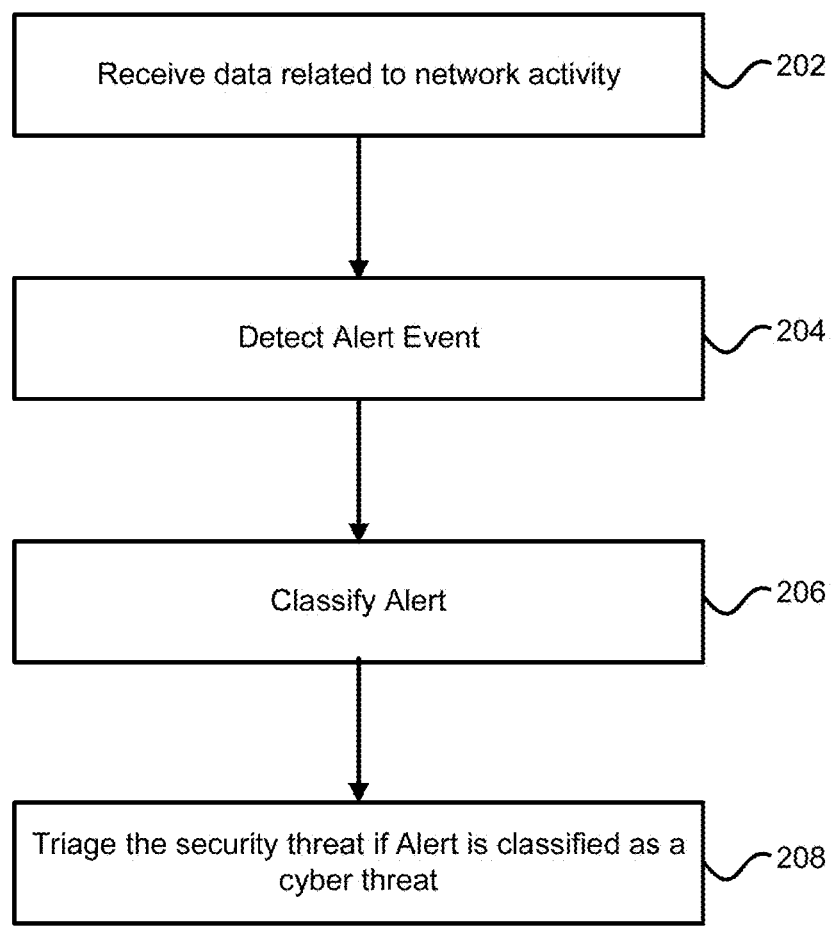
FIG. 2 is a flow chart of an example method 200 for detecting and triaging a cyber security threat event, according to some embodiments.

FIG. 2 is a flow chart of an example method 200 for detecting and triaging a cyber security threat event. In some embodiments, one or more processes described with respect to FIG. 2 may be performed by a server device (e.g. server 120 of FIG. 1). In some embodiments, the method 200 may include receiving network activity related data 202 from an array of client devices (e.g. client systems 105, 110 or 115) that may be user devices and/or devices monitoring network activities and network health. The network data may include proxy logs, endpoint logs, Windows® Event Logs, network logs, email logs, firewall logs, cloud logs and the like. After receiving network data, server 120 may detect 204 an alert event within the network data provided in the network activity related data. This may be done by sifting through the data and determining the existence of an alert event, or in the alternative, detecting a series of events that collectively amount to an alert event. In one embodiment, a rules engine within server 120 may handle generating alerts by matching specific criteria to event logs. The specific criteria may be set by administrators based on network sensitivities and requirements. This may include, but not limited to, examples where a number of login operations triggers an event if it exceeds a threshold number of logins within a predetermined time period. When matches are identified the rules engine may add the alert to an alert queue in a Security Information Event Management system. The Security Information Event Management system may be incorporated within server 120 or run on a separate standalone server (not shown) that may communicate with server 120 via network 125. Once the alert is identified, the alert is then classified 206 as either a security threat, or a benign activity (e.g. business as usual). Moreover, if the event is classified as a security threat, server 120 may then provide a triage solution 208 based on the type of classification of the security threat, as will be further described herein.

Figure 3:
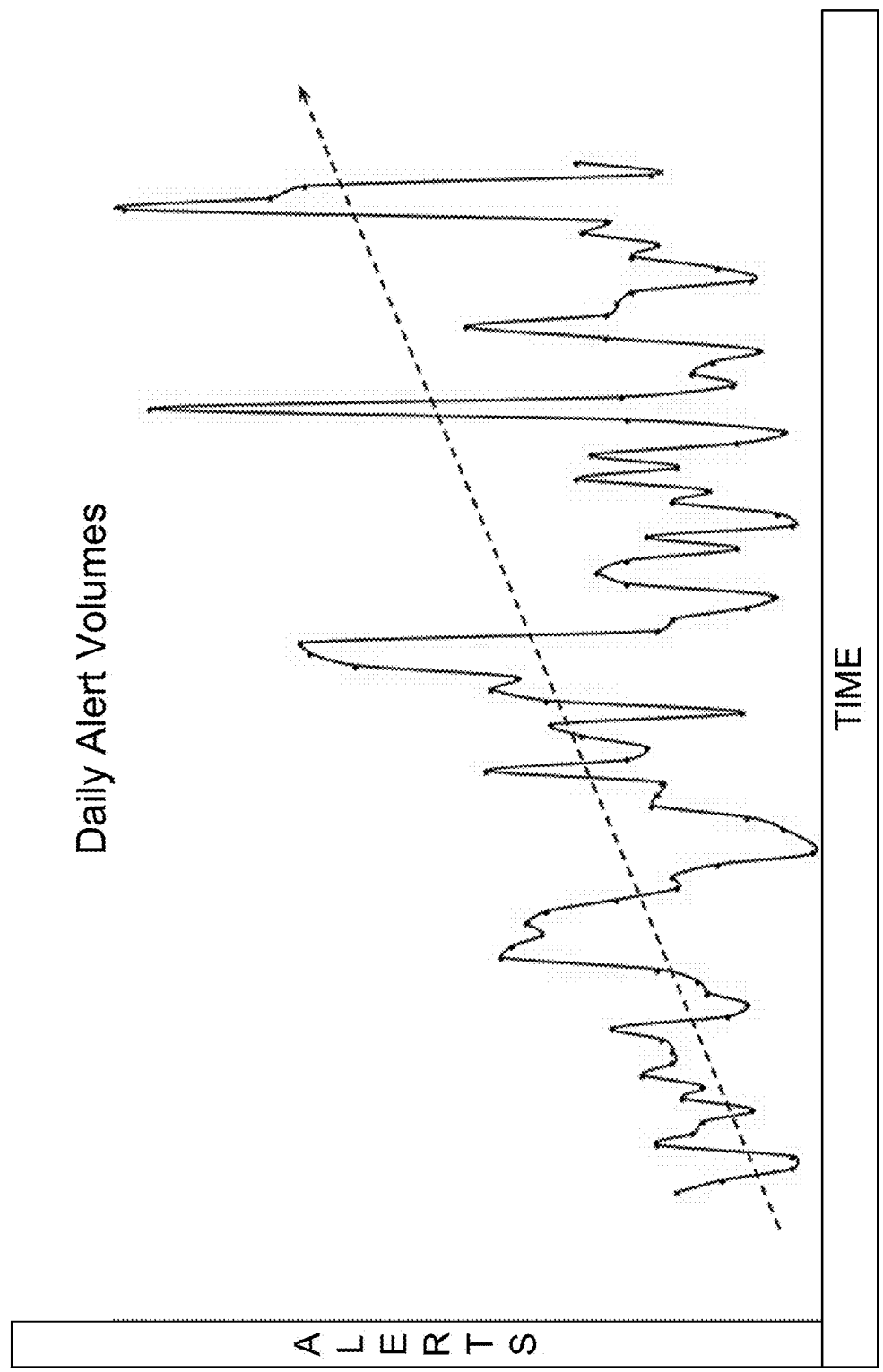
FIG. 3 is a graphical illustration of daily alert volumes for a 90-day period, according to some embodiments.

FIG. 3 is a graphical illustration of daily alert volumes for a period of a few months. The specific dates (x-axis) and alert counts (y-axis) have been obscured due to the sensitive nature of these security alerts. As can be illustrated by the graphic, the average daily alert volume continues to increase over time, thus illustrating a growing trend of received and processed threats over the period of time. There may be several reasons for the increase in alerts. For example, when the network expands, including additional monitoring and sensor coverage, more scenarios are identified and packaged as alerts indicating suspicious or irregular activity. Moreover, the addition/incorporation of machine learning rules means that over time, the system will be more adaptive and will be able to capture more alerts that go through the system.

Alerts may be addressed by manual effort of tier 1 or tier 2 SOC analysts. However, this requires tremendous manual effort and manpower of SOC analysts to investigate the alerts and determine an appropriate classification. Accordingly, the present systems and methods address this issue by providing an automated, scalable threat identification, classification, and mitigation process that can help cut down on analyst manpower, increase efficiency, improve accuracy, and lower costs.

Figure 4:
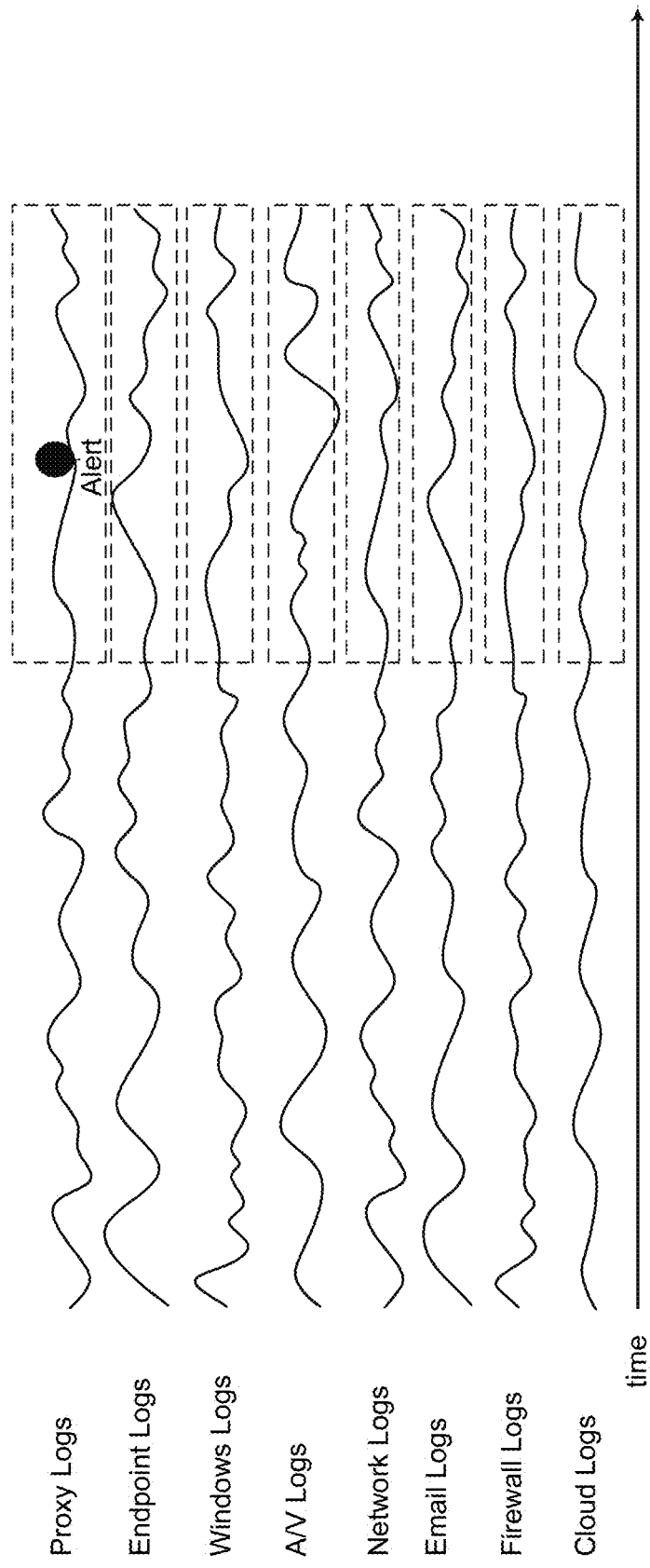
FIG. 4 is an illustration of one or more data streams being provided from network devices, such as client systems, according to some embodiments.

FIG. 4 is an illustration of one or more data streams being provided from network devices, such as client systems 105, 110, and 115. The streams may include, for example, data related to monitored web activity (e.g. web proxy logs), network activity (e.g. firewall logs), endpoint activity (Endpoint Detection and Response (EDR) logs, Windows® Event logs), malware related activity (Anti-Virus logs), email activity (email security logs), cloud activity (AWS, Azure, GCP logs), IT change activity, threat intelligence, and raw packets. Web activity monitoring may include monitoring websites, email, web applications and other programs accessed by users of client system 105, 110, or 115. Network activity may include tracking all network activity, including monitoring bandwidth, databases, network speed/latency, and network devices, such as routers and switches. This may utilize packet sniffing and/or other comparable technologies. Endpoint activity monitoring relates to monitoring end user devices such as mobile devices, laptops, and desktop PCs, although hardware such as servers in data center may also be considered endpoints. Any device, such as a smartphone, tablet, or laptop, may provide an entry point for threats.

Endpoint security monitoring aims to monitor every endpoint connecting to a network and monitor access attempts and other risky activities performed at these points of entry. The need for effective endpoint monitoring and security measures has increased substantially, particularly in light of the rise in mobile threats. With employees relying on mobile devices and home computers and laptops to connect to company networks and conduct business, endpoint monitoring and security measures are increasingly necessary as they can become frequent targets for network security threats. Endpoint monitoring may include network access monitoring, data classification monitoring, user privileges monitoring, disk, endpoint, and email encryption monitoring, application access monitoring and the like.

Malware or malicious software is any computer software intended to harm the host operating system or to steal sensitive data from users, organizations or companies. Malware activity monitoring may include determining the functionality, origin, and potential impact of a given malware sample such as a virus, worm, Trojan horse, rootkit, or backdoor. Commercial malware detection software may be utilized.

Cloud activity monitoring may include a process of evaluating, monitoring, and managing cloud-based services, applications, and infrastructure. There may be multiple types of cloud services to monitor. This may include services like Office 365, Google G Suite, Salesforce and others, developer friendly services like SQL databases, caching, storage and more, servers hosted by cloud providers like Azure, AWS, Digital Ocean, and others, new serverless applications like AWS lambda, Azure Functions, and the like, and application hosting services. Cloud monitoring works through a set of tools that supervise the servers, resources, and applications running web-hosted applications. These tools may be in-house tools from the cloud provider, or tools from independent SaaS provider.

IT change activity may be detecting and tracking incident, problem, and change in IT operational events. This includes reporting and monitoring of expected IT changes or changes occurring during an IT (non-security) incident such as a critical production outage or service degradation. These changes are typically tracked through objects called "Change Orders" which provide detailed accounting of expected (and approved) changes. These Change Orders carry useful metadata like the associates expected to be implementing the change, the systems where the changes will occur, the expected time window of the change, and the context of the change.

Threat intelligence may be defined as evidence-based knowledge, including context, mechanisms, indicators, implications and actionable advice, about an existing or emerging menace or hazard to assets that can be used to inform decisions regarding the subject's response to that menace or hazard. Events related to the alert in question may be correlated with threat intelligence and used and passed on to the monitoring server (e.g. server system 120) to provide further context as will be further discussed herein.

Figure 5:
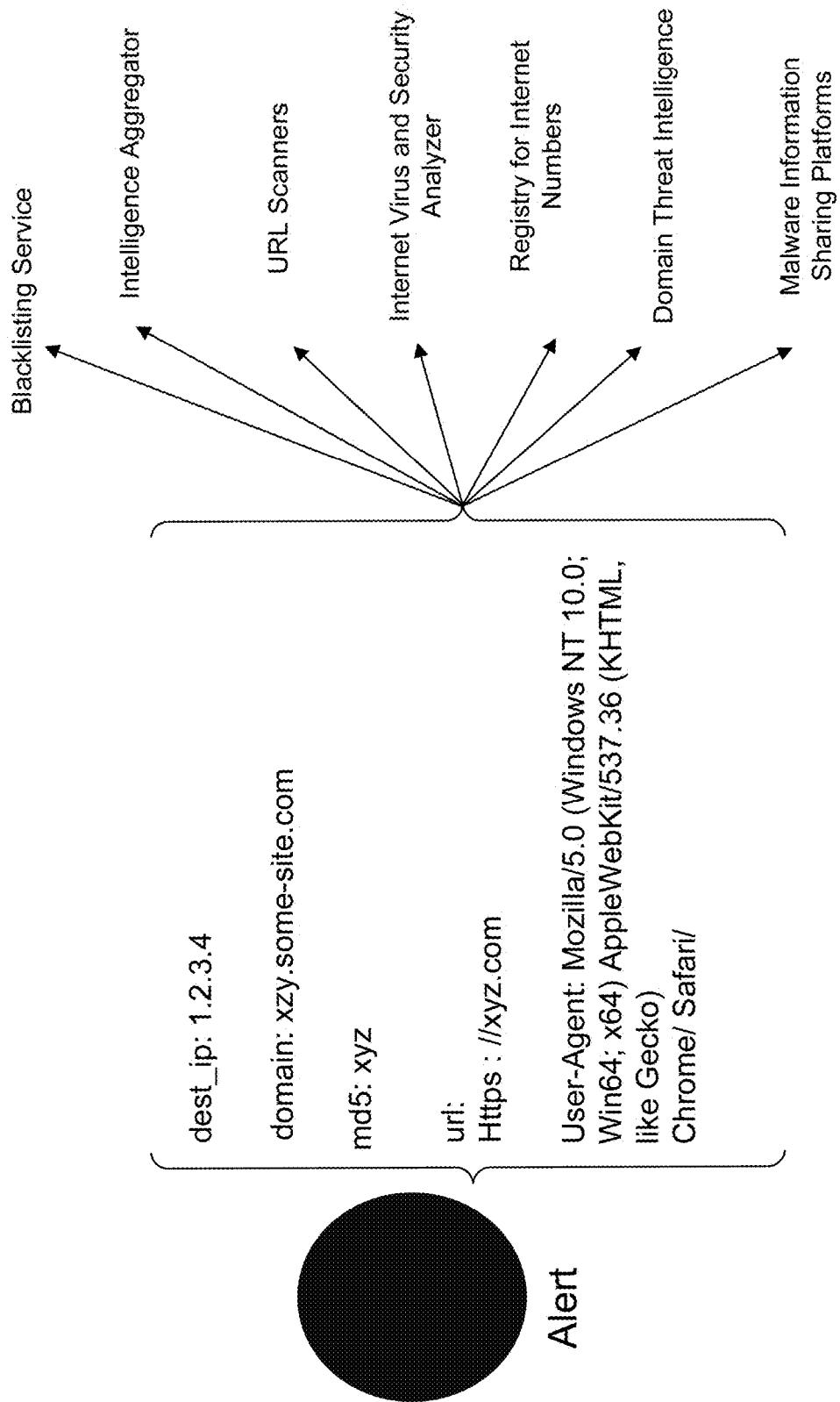
FIG. 5 is directed to the processing of information for generating context, according to some embodiments.
Figure 6:
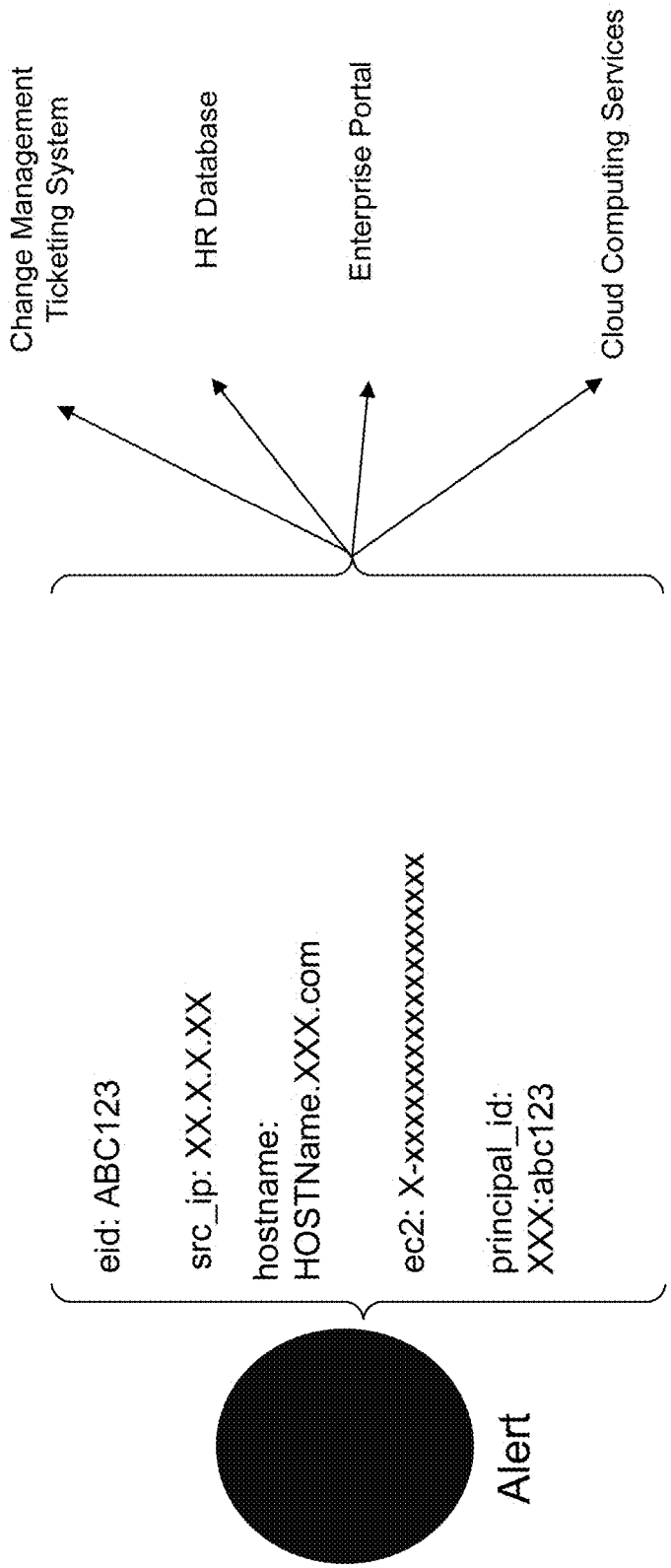
FIG. 6 is directed to the processing of information for generating context, according to some embodiments.

FIG. 5 and FIG. 6 are directed to the processing of information for generating context. In evaluating the threat assessment and determination of whether the alert is a true security threat or a business as usual event, the triage system looks into events surrounding the alert event in order to provide additional context. One such context may be event metadata relating to the alert. This metadata may include a destination IP address, a domain name associated with the alert, a URL, and a user agent. In one example, the context may be external context, as illustrated in FIG. 5, where sources such as commercial and open source threat intelligence databases/services and the like are used to provide the metadata relating to the alert. The context may also be internal context, as illustrated in FIG. 6, where sources such as internal employee metadata (including job role, location, department, manager, org chart, etc.) and the like may be used to provide the metadata relating to the alert.

Figure 7:
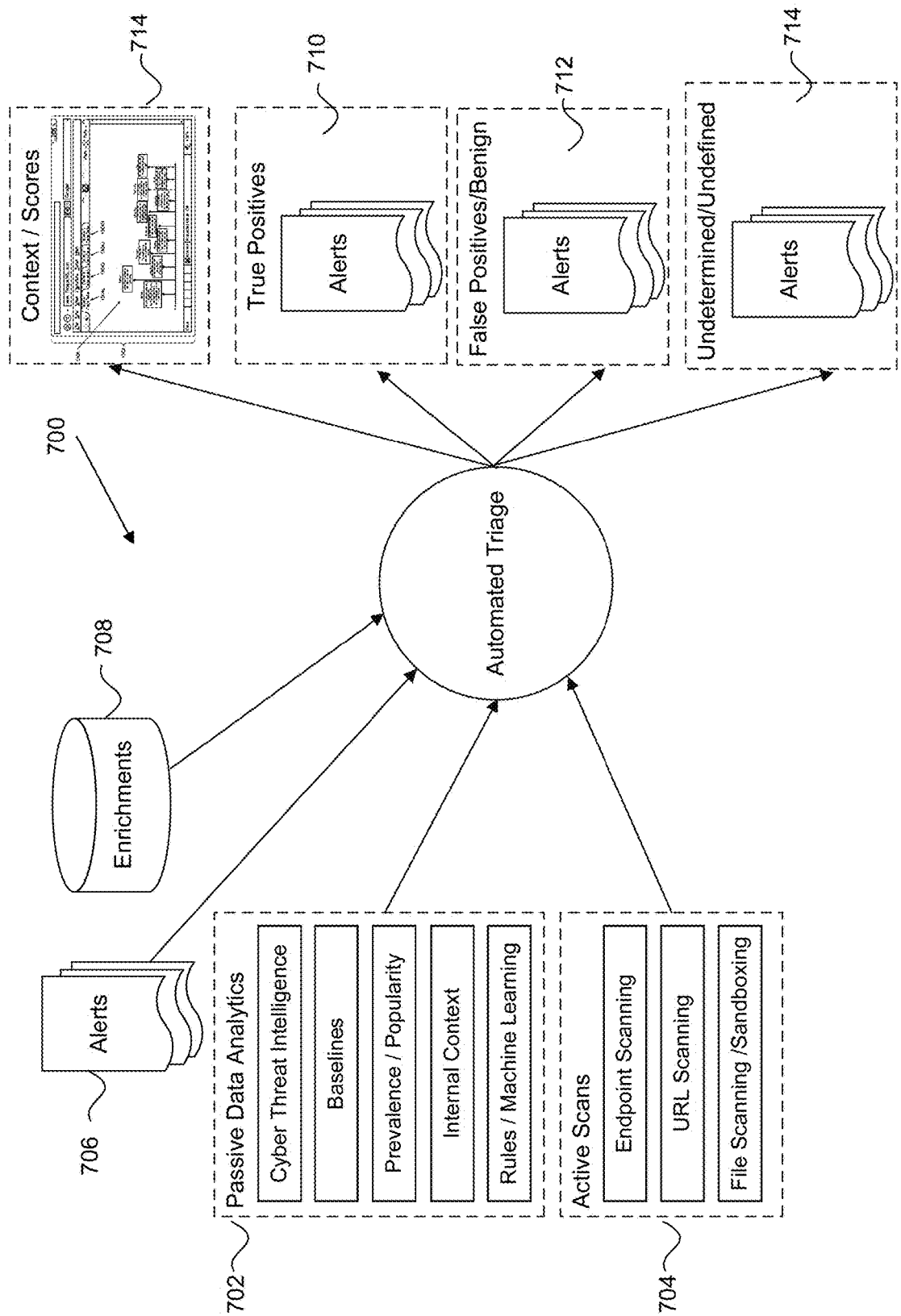
FIG. 7 is an illustration of cyber security alert triage system, according some embodiments.

FIG. 7 is an illustration of cyber security alert triage system according to an exemplary embodiment. Triage system 700 may be implemented by server system 120 (in FIG. 1) and configured to identify true positive alerts and output triage analysis and recommendations for addressing the security threat, as will be further discussed herein.

Triage system 700 may perform passive data analytics 702, and active scans 704 to collect network data. Passive data analytics may include cyber threat intelligence, internal network baselines, prevalence/popularity determinations, internal context, and rules/machine learning context based on prior data sets. Passive data analytics 702 may further include collection of cyber threat intelligence sightings, backend data stores, and may produce pre-computed question focused datasets (QFD) using the techniques described above. Active scans 704 may include endpoint scanning, URL scanning, and file scanning or sandboxing. The collection of this data enables triage system 700 to determine whether an activity is normal, whether an activity is related to business as usual activities, whether an activity is suspicious, whether the activity involves any known indicators of compromise (IOCs), whether the activity involves any new IPs, domains, executables, user agents, and whether the activity involves any rare IPs, domains, executables, and user agents. The data collected, along with the context can help determine a compromised device, compromised account, malicious intent, and the like.

Triage system 700 leverages a mixture of passive data analytics and active checks to provide an identification and triage of security threats based on alerts, context and related activity metrics as further described herein. Passive data analytics as discussed above are done on a continuous basis, and at a network wide scale. The results of the passive data analytics may be stored in a cyber database and may be used as inputs into triage workflows that are question driven. The results may also be used for new alerting use cases and provided as starting point for machine learning/artificial intelligence training applications.

In some embodiments, the passive data analytics and the active scans may provide alerts considered by the triage system 700. Additionally, triage system 700 may receive alerts 706 from external sources. Enrichments provide additional information that help the system or an analyst further contextualize an alert. This could include information like domain Whois, IP Geolocation, top/popular domain lists, or other external commercial or open source non-threat data.

After receiving passive data analytics 702, active scans 704, alerts 706 and enrichments 708, triage system 700 would then determine, from all the received alerts, which ones are true positive alerts 710, which are false positive/benign alerts 712, and which are undetermined/undefined, and provide a triage output to SOC analyst for a solution addressing the true positive alerts. True positive or undefined alerts may be alerts that are identified as security threats to the network, wherein false positive and benign alerts may be business as usual type activities with some normal irregularities. Differentiating between true positive alerts and false positive/benign alerts may be done using the following steps described in FIG. 9 as a high-level guideline.

Figure 8:
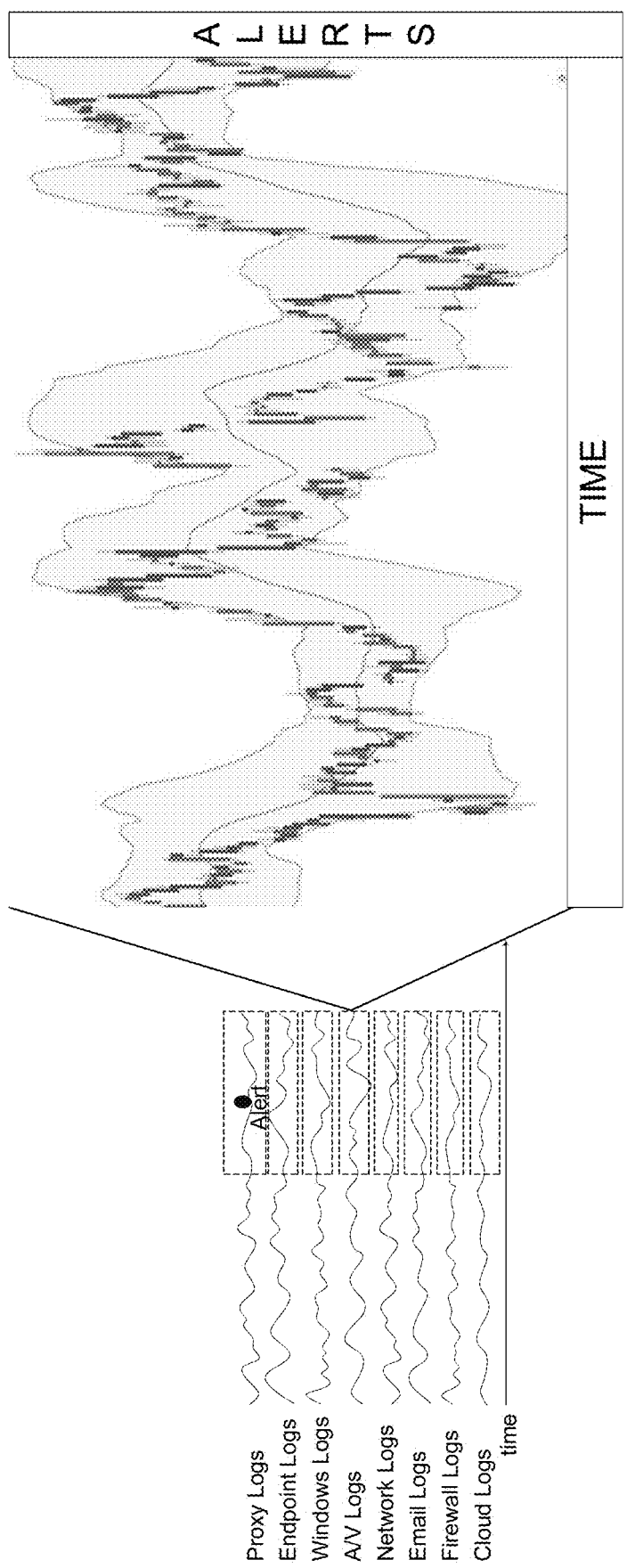
FIG. 8 illustrates mapping of and establishment of a baseline for processed data activities, according to some embodiments.

FIG. 8 illustrates mapping of and establishment of a baseline for processed data activities, according to some embodiments. The baselining system is useful to identify deviation away from normal activity as a way to determine whether an alert is a true positive alert (e.g. a true threat) or a benign activity. The baselining system uses a mixture of statistical analysis and unsupervised machine learning in order to capture baseline activity measures across many dimensions. This system learns what "normal" activity patterns look like from historical data and stores these patterns of normal activity (known as "baselines") for later comparisons. Baselines are encoded as very compact and efficient representations that enable the identification of outliers or anomalous activity. When this activity is identified in events correlated with an alert, it is made apparent to the user through a human readable description of what happened (e.g. "Within the last 24 h, user ABC123 uploaded 10.5× more data via HTTP POST than they usually do." Or "Within the last 24 h, user ABC123 attempted to authenticate to 30× more hosts than usual.").

Figure 9:
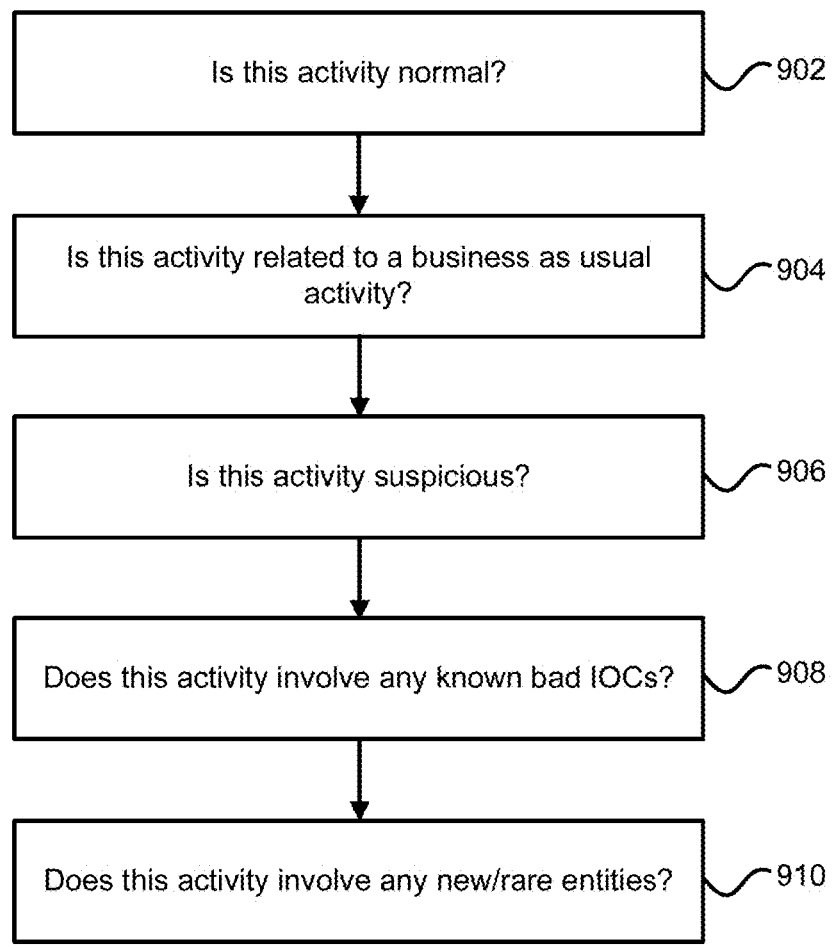
FIG. 9 illustrates a flow diagram for determining true positive alerts for triaging, according to some embodiments.

FIG. 9 illustrates a flow diagram for determining true positive alerts for triaging, according to an exemplary embodiment. In one example, process 900 may include determining if an activity is a normal activity 902, if an activity is related to a business as usual activity 904, if an activity is suspicious 906, whether the activity involves any known bad IOC's 908, and whether the activity involves any known bad IOC's 910. In one aspect, process 900 may follow steps 902 through 910 in a consecutive order. Alternatively, any one of the steps can be performed at any given time in the process based on available information to server 120 for example.

In determining whether an activity is normal or not, server 120 may evaluate the baseline activity across all relevant event streams on several dimensions (e.g., user, host, job, role, team, etc.). The baseline activity may be used during event triage when evaluating activities that deviate from the baseline, but may also be available for alerting and use cases as well. If an activity is deemed to be within a baseline range (e.g. within one standard deviation unit), the activity may be deemed normal. For example, if a user (e.g. user ABC123) uploaded 10.5× more data via HTTP POST than they usually do, or within the last 24 h, user ABC123 attempted to authenticate to 30× more hosts than usual. Activity exceeding "normal" activity are recorded as "signals" in the database DB, and these may be used during the triage of any alerts that may be correlated with the baseline signal.

Signals may represent noteworthy events of interest that are especially useful during alert triage. Server 120 may proactively identify these events and retrieve them for further analysis/calculation/representation/recommendation for the analyst. For example, the signals may be used as inputs into various machine learning (ML) models on server 120 to characterize and score an alert.

In one example, alert triage ML models may be trained using past incident outcomes (true positive, false positive, etc.) as labels. The models may use signals from baselines, prevalence, popularity, and rules as features. Each of these items may be summarized in order to be encoded in the proper format for the model. The ML models may also use enrichment data as further features, and one or more models may be used since several different alert categories exist and different alerts have vastly different expected signals (e.g., commodity malware related alerts vs. cloud data exfiltration alerts vs. insider threat alerts).

A triage engine may also be deployed. The triage engine would have alerts as inputs, and processes the alerts by retrieving all related signals, retrieving any relevant enrichment data, uses pre-trained ML models to score the combination of inputs (e.g. alerts, signals, enrichments), outputs (e.g. numeric score, recommended action) and stores the results alongside the alert in the same case management system.

Business as usual activities may also be activities or IT incidents that occur during deployments of software systems. While rare, they may be flagged as risks but can be identified as business as usual events by looking at the Change Order/IT Incident details in a Change Management Ticketing System. Server 120 may also consider data relating to the user's entitlements as an explanation for their activities and their job role. For example, the incident may be related to a network team logging into multiple routers during installation or maintenance operations. The existence of approved change orders and user's entitlements that strongly correlate with an alert may be used to down weight the alert, especially if the context of the alert maps to the context of the approved change. This context mapping is performed using a machine learning model that scores the contextual similarity between an open change order and an alert. The change order may be a pre-scheduled maintenance event or the like relating to the network. Accordingly, these may be also taken into account in order to reduce false positive triggers based on the fact that such events, while may generate alerts, are part of a change order that may be pre-approved.

In determining whether an activity is a suspicious activity, rules are deployed that take into account the type of alert, context of the alert, and related activity. In one example, an output of a rule may be referred to as signals. When an activity is deemed suspicious through the determination of the alert, context, and related activity prism, the signals may then be laid out and mapped across a timeline (as further illustrated in FIG. 14). These signals provide visual representation of what the event is, the context and the related activities, which when combined, classify the alert as a true positive alert (e.g. malicious activity).

Example suspicious activities may include, for example, lateral movement to/from a host, flagging or quarantining of any files by any commercial antivirus software, user receiving emails from external addresses with attachments, web proxy block events for a particular host, URLs with IP address but no referrer, and so on. Patterns that are more complex, may utilize available machine learning models on server 120. These patterns may include obfuscated PowerShell detection, beacon detection, domain generation algorithms (DGA) detection, dictionary DGA detection, and the like.

Prevalence/popularity analytics may be useful in identifying suspicious activity related to an alert. These analytics seek to identify activity associated with new or rare entities such as domain names, executables, etc. For example, is this the first sighting of this activity, last sighting, how often is this activity sighted, any unique users/hosts related to the activity may also be contemplated. Considering this data point, at the time an alert is detected, within some time window of the alert, server 120 may check if the host interacted with any new or rare entities. For example, did it interact with any new/rare domain names or did it use a user-agent that has not been seen before, or did it execute any files or load any DLLs that have not been encountered previously in the network? In addition to determining whether this data constitutes malicious attacks, such data may also be used as building block for new alerting use cases.

Figure 10:
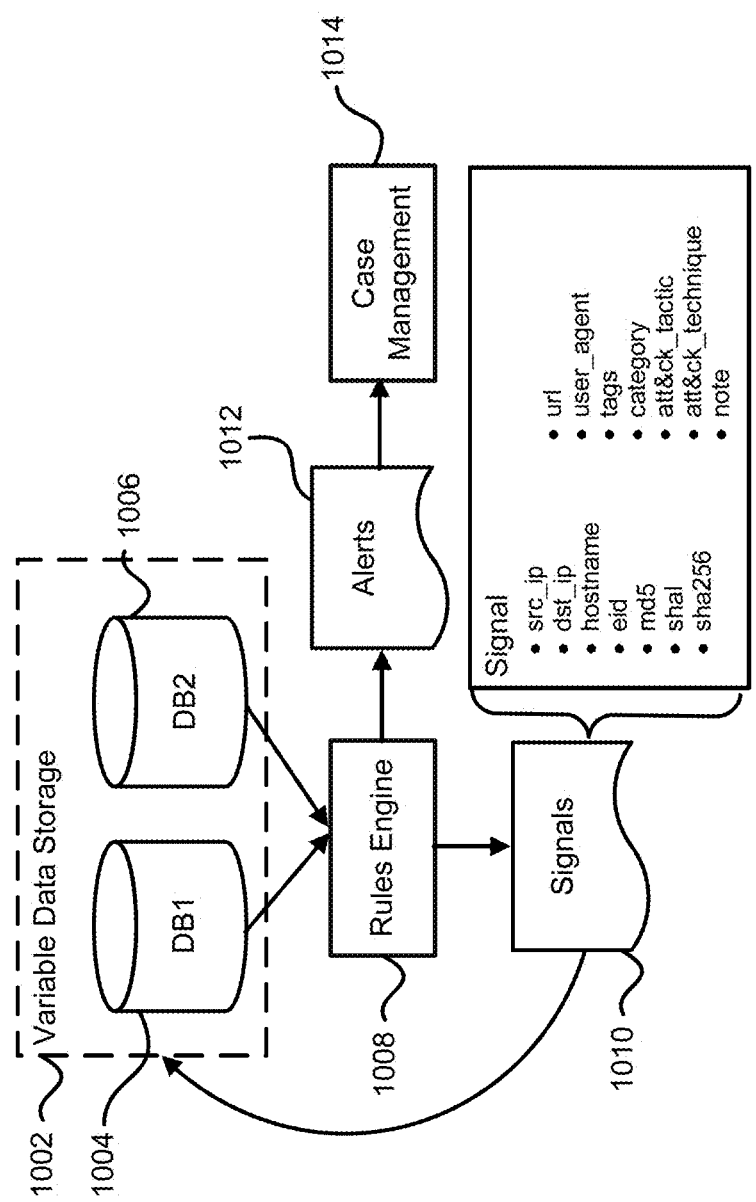
FIG. 10 is a block diagram of a triage system data housing and processing, according to some embodiments.

FIG. 10 is a block diagram of the subsystem for creating "Signal" from mining security log data. This system is similar to classic rule based alerting systems, but it produces outputs that are not designed to be actionable or alert-worthy, rather they are designed to provide context that is useful to SOC analysts in the event of an alert that can be correlated (through common attributes and through time) with one or more signals. FIG. 11 shows an example of how this may be useful. In this diagram, an alert fires (see object 1102) and all correlated signals for that alert are retrieved (1104, 1106, 1108, 1110, 1112, 1114, 1116, 1118, 1120, and 1122). These signals provide context that the analyst needs to triage the alert more effectively. These same signals also provide valuable inputs for Machine Learning models that consume the alert and related signals and then produce scores/recommended actions.

For example, if an alert is raised that client device 105 accessed a malicious website, this alert on its own may not sufficiently rise to a true positive alert. Initially, an analyst would be required to investigate this event and piece together a series of events that may not be accessible to the analyst in order to determine the nature of the alert. Alternatively, in the present disclosure, once an event is tagged as an alert, server 120, for example, may retrieve all relevant data surrounding the alert within a predetermined time window. This provides related content for the alert that would enable the system to classify the type of alert and how to best address it.

Considering the previous example, if client device 105 accesses a malicious website, an event is triggered and server 120 may then retrieve content related to the event within a predetermined time window. In this regard, content may include answers to the previously gathered information within the passive data analytics and the active scans. In one example, server 120 may retrieve data associated with whether client device 105 may have accessed other cites, ran certain suspicious scripts and the like. Triage system 1000 may include a variable data storage 1002 that feeds data into rules engine 1008. In one example rules engine 1008 may be constantly querying the two data storages 1004 and 1006 within variable data storage 1002. Data storage 1004 may be a traditional SQL based data warehouse that can house large quantities of data, wherein data storage 1006 may be an Elasticsearch cluster that enables real-time interactive speed searches. Accordingly, it is beneficial to house recent data (e.g. up to two weeks old) in data warehouse 1006 and historical data that is older (e.g. six months to one year) in data warehouse 1004. Data warehouse 1004 and 1006 are both designed to house the same types of data, which is data generated from the data loggers (network monitoring devices).

In one embodiment, rules engine 1008 may detect an alert and query the variable data storage for related events that, on their own, are not sufficiently actionable. These related events are searched within a specific time window around the time in which the event occurred. When signals are generated, rules engine would then correlate the events with the alert in order to classify the alert and related remedy. The metadata of the alert and metadata of the signals may be utilized to perform the correlation. As previously discussed, alerts and signals include meta data with further identification of the alert, origination, location, equipment and users it is associated with. Accordingly, such correlation strengthens or weakens the possibility of the alert event being classified as a malicious event. For example, if an alert and a signal, when being correlated, have the same destination IP or originate from the same domain, or are associated with the same user, etc., then such correlation association strengthens the likelihood of contextual support for a potential malicious threat.

FIG. 11 illustrates a signal timeline of signals that are correlated with the alert event to produce an alert and related activities mapping. It can be appreciated that the timeline may also include charts/graphs from baseline, summaries of threat intelligence hits, and/or summaries of internal context collected. This mapping can help a SOC analyst to automatically identify the alert, and a chronology of related events that collectively, produce a cyber threat event. Moreover, as will be further seen herein, the plot produced on a display associated with a server or computing device (e.g. server 120) may also include additional diagnostics and triage support to help remedy the problem caused by the cyber threat event.

In FIG. 11, an alert event is initially plotted 1102 as an alert containing a macro enabled MS Office being downloaded. Thereafter, server 120 (using, for example rules engine 1008), may access variable data storage 1002, in order to retrieve signals related to the alert event within a predefined time window. The size of the time window may be based on the type of alert or the alert metadata. For example, some types of alerts may require more substantive data points and therefore, a larger time window for investigating related data, wherein others may require fewer data points to reach a conclusion on the disposition of the alert event and whether or not it is a malicious threat.

Once the window size is established, server 120 may query all the correlated signals, that are saved on variable data storage 1002 related to the alert event. In one embodiment, the signals help provide a context related to the event in order to determine whether the alert event is truly a cyber security threat. Signals are used to both automatically score/characterize the alert (through a machine learning model) and they are rendered with the alert so the user doesn't need to go find them by manually investigating all the raw log data.

In the present example, server 120 may indicate, to a SOC analyst the following events occurring as signals collectively amounting to a security threat: signal 1104 indicating user received an email with an attachment from an external address, signal 1106 indicating that a file was executed from a temporary directory (as provided by Sysmon, a system monitor provided by Microsoft®); signal 1108 indicating an obfuscated PowerShell that was executed, signal 1110 indicating an EXE file was downloaded from an IP based URL, signal 1112 indicating a never seen before EXE that was executed, signals 1114, 1116, and 1118 indicating a "Living-off-the-Land Binary and Script" command (LOLBAS—these are tools built-in to most systems that are commonly used during post device compromise for furthering the adversary's objectives) was run at a particular point in time after the alert, signal 1120 indicating a host reaching out to greater than 3 blocked destinations, and signal 1122 indicating a possible beaconing event being identified.

Figure 12:
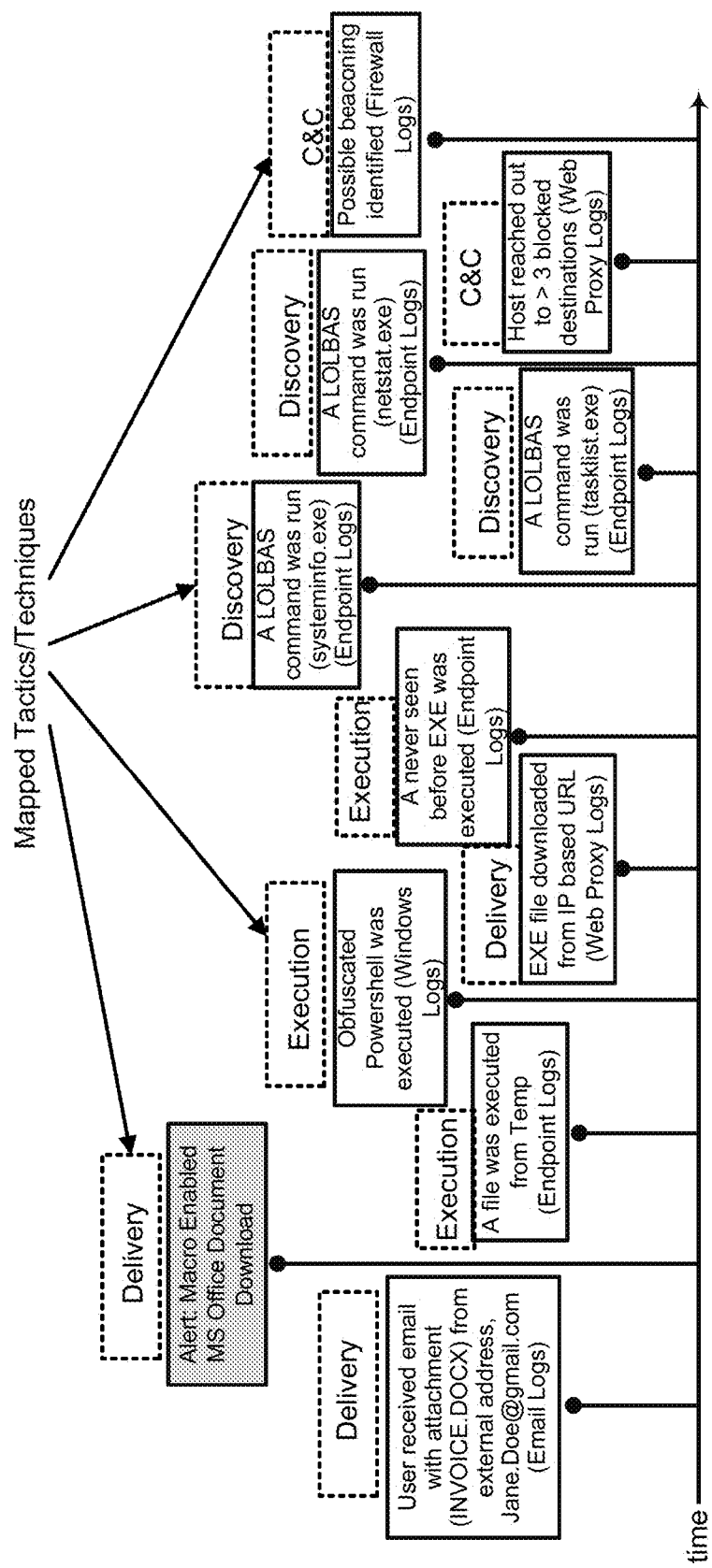
FIG. 12 illustrates a method of identifying tactics and techniques used by a cyber-attack that are associated with each correlated activity plotted on a graphical user interface, according to some embodiments.

FIG. 12 illustrates a method of identifying tactics and techniques used by a cyber-attack that are associated with each correlated activity plotted on a graphical user interface. The signals retrieved by server 120 and plotted on the GUI may reflect different tactics and techniques used by the cyber-attack in order to infiltrate a network. For example, a tactic may be an outline of the way an adversary chooses to carry out an attack from beginning to end, wherein a technological approach of achieving intermediate results during the attack campaign may be referred to as a technique that the attacker utilizes. Other operations may include procedures, which reflect an organizational approach of an attacker. It is vital for a triage system and a SOC analyst to understand how identified signals associated with a cyber-attack event (e.g. alert 1102) can be mapped to an attacker's tactics, techniques, and procedures.

Knowing the tactics of an adversary can help in predicting the upcoming attacks and detect those in early stages. Understanding the techniques used during the campaign allows to identify organization's blind spots and implement countermeasures in advance. Finally, the analysis of the procedures used by the adversary can help to understand what the adversary is looking for within the target's infrastructure. Accordingly, an object of the present disclosure is to map out the derived signals associated with the threat alert onto a tactic, technique and procedure, in order to expedite deployment of a remedial solution, either by the system or a network engineer (depending on the organizational infrastructure).

In the present example of FIG. 12, server 120 may map the signals to tactics utilized by the attacker. For example, server 120 may indicate that the series of signals are mapped to delivery, execution, discovery and command and control tactics. There are many different sets of tactics that may be utilized, including, for example, a tactics matrix used by MITRE ATT&CK™ providing enterprise and mobile matrixes for techniques and tactics. Instead of guessing how a particular event/signal may be classified, server 120 maps out every signal onto an attack matrix in order to classify the attack and determine a remedial step. The delivery tactic may be an initial access tactic that represents the vectors adversaries use to again an initial foothold within a network. The tactic includes a plurality of techniques, including, for example, exploiting public facing applications, external remote services, and the like.

An execution tactic represents techniques that result in execution of adversary-controlled code on a local or remote system. This tactic is often used in conjunction with initial access (delivery) as the means of executing code once access is obtained, and lateral movement to expand access to remote systems on a network.

A discovery tactic consists of techniques that allow the adversary to gain knowledge about the system and internal network. When adversaries gain access to a new system, they must orient themselves to what they now have control of and what benefits operating from that system give to their current objective or overall goals during the intrusion. The operating system provides many native tools that aid in this post-compromise information-gathering phase.

A command and control tactic represents how adversaries establish communication and communicate with systems under their control within a target network. There are many ways an adversary can establish command and control with various levels of covertness, depending on system configuration and network topology. Due to the wide degree of variation available to the adversary at the network level, only the most common factors were used to describe the differences in command and control. There are still a great many specific techniques within the documented methods, largely due to how easy it is to define new protocols and use existing, legitimate protocols and network services for communication.

The resulting breakdown should help convey the concept that detecting intrusion through command and control protocols without prior knowledge is a difficult proposition over the long term. Adversaries' main constraints in network-level defense avoidance are testing and deployment of tools to rapidly change their protocols, awareness of existing defensive technologies, and access to legitimate Web services that, when used appropriately, make their tools difficult to distinguish from benign traffic.

The above listing of tactics and techniques is meant to be illustrative, and is by no means exhaustive of the potential tactics and techniques that may be classified in order to address cyber-attacks. These tactics and techniques may be mapped onto existing matrices provided by third parties (e.g. MITRE ATT&CK) or internally developed classifications. Such tactics may also include initial access tactics, persistence, privilege escalation, defense evasion, credential, lateral movement, exfiltration tactics, with their own associated techniques. The mapping and visual display of the mapped classifications enable a system and SOC Analyst to better comprehend the level of risk at hand, and how to best address the issue. This helps cut computational bandwidth and expedites time needed by the system and/or a SOC Analyst and determining what steps are required next. For example, a course of action associated with a command and control tactic may be different from a course of action relating to a delivery tactic.

Figure 13:
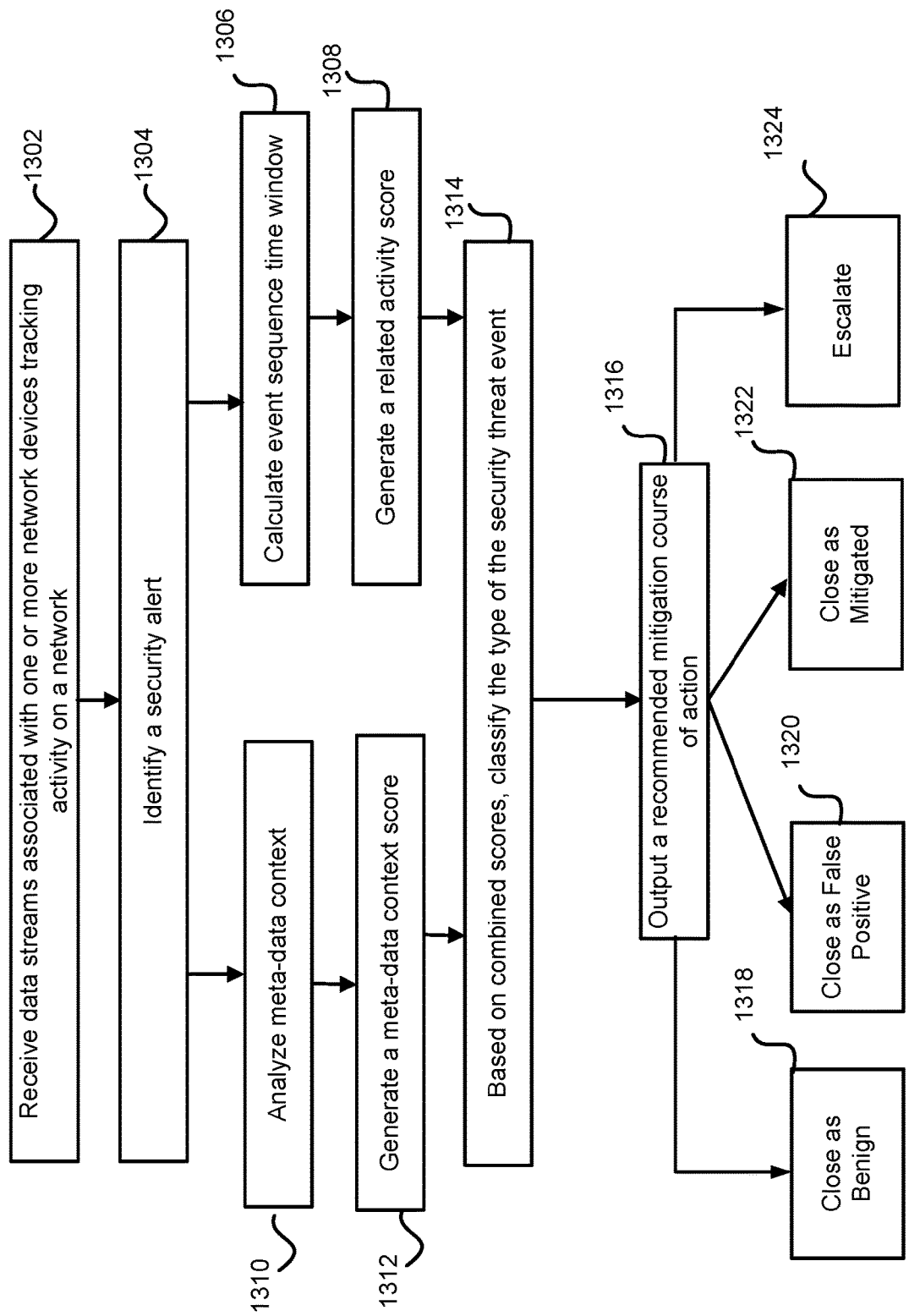
FIG. 13 is directed to a method for identifying and classifying cyber-security threats, according to some embodiments.

FIG. 13 is directed to a method for identifying and classifying cyber-security threats, according to some embodiments. Method 1300 includes receiving 1302, at a server device, data streams associated with one or more network devices tracking activity on a network. The data streams may be data logs collected by data loggers and stored within an accessible database. When the data streams are received (or retrieved), the method includes identifying a security alert 1304, calculating event sequence time window 1306, generating a related activity score 1308, analyzing meta-data context 1310 and generating a meta-data context score 1312. In one example, the calculation of the event sequence time window and the analysis of the meta-data may be performed simultaneously, or sequentially, as best fits the available system resources and bandwidth. The generated related activity score and meta-data context score are designed to enrich the analysis with context, both about the alert itself, and about related activities surrounding the alert event. In this regard, classification of the alert and the threat level assessment of the alert may be enhanced.

The related activity score and the meta-data context score can be scores ranging from 0 to 1, with scores closer to 1 being indicative of higher correlation and/or relativity. For example, a meta-data context score of 0.7 may indicate that the alert in question may have originated from, or includes meta data that is more likely than not associated with malicious behavior. Similarly, a related activity score of 0.7, for example, may indicate that the activities surrounding the alert (e.g., login data, run executables, etc.) more likely than not, collectively, are associated with malicious activity. In one example, the respective scores may be generated as output from machine learning models that analyze features derived from the respective input data for a set period of time. For instance, the related activity score's model uses features such as: minimum prevalence age of URLs accessed before and after the alert, minimum popularity count of URLs, accessed before and after the alert, count of URLs accessed that fall into known threat intelligence categories like C2 domain/exploit kit, minimum prevalence age of all binaries executed on the host, minimum popularity count of all binaries executed on the host, number of data access anomalies, number of potential data exfiltration anomalies, etc. Features chosen may be due their predictive power and high correlation to the specific characteristics that analysts look for during a triage process.

Based on a combination of the meta-data context score and the related activity score, the method includes classifying the type of the security threat event 1314. Such classifications include, but is not limited to, benign threats, false positive threats, mitigated threats, live threats, and the types of live threats. As such, after classification, the method includes outputting a recommended mitigation course of action 1316. The output may be provided on a display associated with the risk mitigation system, a remote user equipment, mobile device, or the like. Some of the recommended mitigation courses of action may include a recommendation to close the file as the alert is benign 1318, close as a false positive 1320, close as mitigated 1322, or further escalate the process 1324. A determination of a benign alert may involve a singular event that triggered the alert, but does not amount to a malicious threat. In one example, this may involve a login operation from an unrecognized device, or running a never seen before executable, that by themselves, do not amount to a threat. One way to differentiate false positives from benign activities is discussed herein in FIG. 9. Such determination may rely on whether the activity involves any known bad IOCs and whether the activity involves any new or rare entities.

A recommendation to close a file as mitigated may rely on the related activity score. For example, if a meta-data context score is sufficiently high to raise an alert level to a threat, but the related activity score is slow, it may indicate that a series of activities have taken place that have addressed the issue. Additionally, or in the alternative, the system may track previously mitigated risks and note that for an analyst.

Escalation 1324 may include providing recommended triage steps, providing comments for addressing the security threat, such as remotely shutting down a device in question, and the like. Other escalation options may include displaying a contextual timeline of related events (e.g., as discussed in FIG. 15) and providing triage status updates for each alert. This may include alerts associated with devices, (e.g., device 1 alert status, device 2 alert status, and so on) or in the alternative, as discussed further in FIG. 16, a device topology where network devices are mapped out and animations relating to devices associated with alerts are displayed. This may enable an analyst to see physical manifestation of what triages are needed, where they are, and the types of devices that are in question. Escalation 1324 may further include recommended steps for countering the threat event, and how to go about it. This may include listing of devices and procedures that need to be carried out by a human operator, and/or by a computer system (e.g. server 120) pending an administrative approval. Additional triage steps may include automatically collecting forensic artifacts from the host in question such as copies of potential malware, dumps of the machine's volatile memory, process lists, DNS cache, etc. This artifact collection further enables follow on automated triage analysis.

Figure 14:
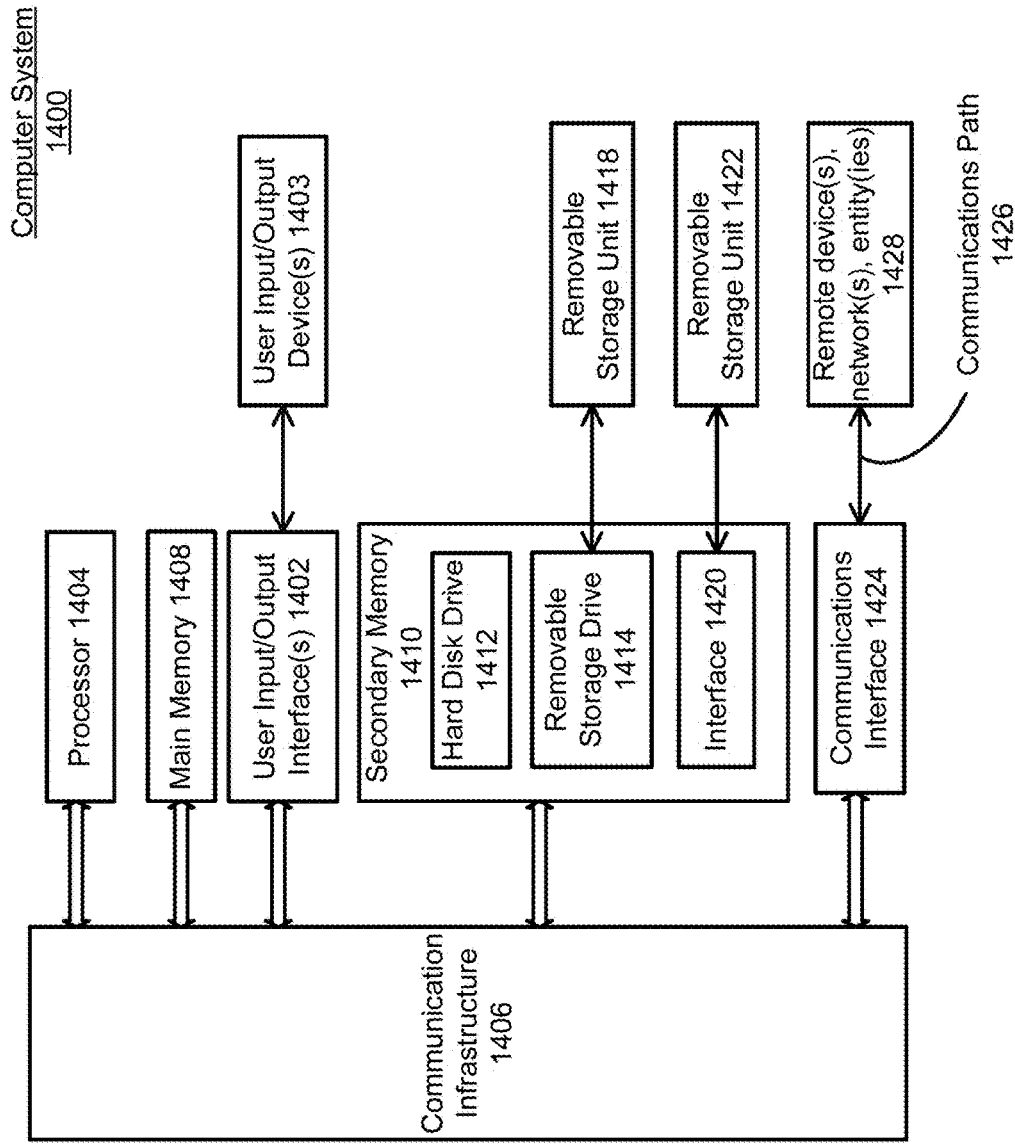
FIG. 14 is directed to a computer system that may implement various embodiments of the present disclosure.

Various embodiments may be implemented, for example, using one or more well-known computer systems, such as computer system 1400 shown in FIG. 14. One or more computer systems 300 may be used, for example, to implement any of the embodiments discussed herein, as well as combinations and sub-combinations thereof.

Computer system 1400 may include one or more processors (also called central processing units, or CPUs), such as a processor 1404. Processor 1404 may be connected to a communication infrastructure or bus 1406.

Computer system 1400 may also include user input/output device(s) 1403, such as monitors, keyboards, pointing devices, etc., which may communicate with communication infrastructure 1406 through user input/output interface(s) 1402.

One or more of processors 1404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1400 may also include a main or primary memory 1408, such as random-access memory (RAM). Main memory 1408 may include one or more levels of cache. Main memory 1408 may have stored therein control logic (i.e., computer software) and/or data.

Computer system 1400 may also include one or more secondary storage devices or memory 1410. Secondary memory 1410 may include, for example, a hard disk drive 1412 and/or a removable storage device or drive 1414. Removable storage drive 1414 may be a floppy disk drive, a magnetic tape drive, a compact disk drive, an optical storage device, tape backup device, and/or any other storage device/drive.

Removable storage drive 1414 may interact with a removable storage unit 1418. Removable storage unit 1418 may include a computer usable or readable storage device having stored thereon computer software (control logic) and/or data. Removable storage unit 1418 may be a floppy disk, magnetic tape, compact disk, DVD, optical storage disk, and/any other computer data storage device. Removable storage drive 1414 may read from and/or write to removable storage unit 1418.

Secondary memory 1410 may include other means, devices, components, instrumentalities or other approaches for allowing computer programs and/or other instructions and/or data to be accessed by computer system 1400. Such means, devices, components, instrumentalities or other approaches may include, for example, a removable storage unit 1422 and an interface 1420. Examples of the removable storage unit 1422 and the interface 1420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1400 may further include a communication or network interface 1424. Communication interface 1424 may enable computer system 1400 to communicate and interact with any combination of external devices, external networks, external entities, etc. (individually and collectively referenced by reference number 1428). For example, communication interface 1424 may allow computer system 1400 to communicate with external or remote devices 1428 over communications path 1426, which may be wired and/or wireless (or a combination thereof), and which may include any combination of LANs, WANs, the Internet, etc. Control logic and/or data may be transmitted to and from computer system 1400 via communication path 1426.

Computer system 1400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1400, main memory 1408, secondary memory 1410, and removable storage units 1418 and 1422, as well as tangible articles of manufacture embodying any combination of the foregoing. Such control logic, when executed by one or more data processing devices (such as computer system 1400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 14. In particular, embodiments can operate with software, hardware, and/or operating system embodiments other than those described herein.

Figure 15:
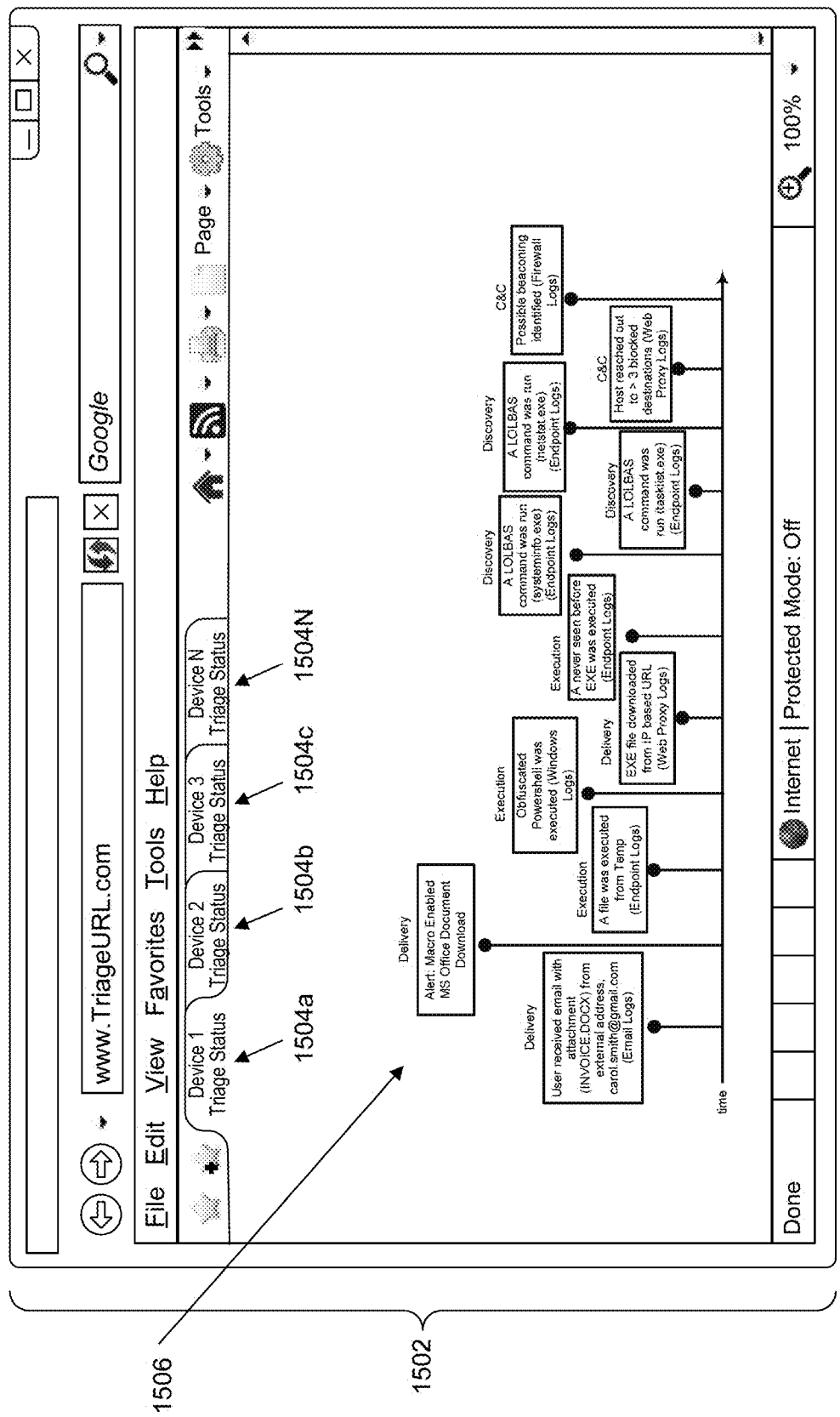
FIG. 15 illustrates a mapping of security alert signals and related graphics, according to some embodiments.

FIG. 15 illustrates a display rendering of security alert signals and related graphics based on exemplary embodiments. In one embodiment, server system 120 may provide a graphical rendering 1502 of the detected security alert, along with the timeline 1506 that shows the related signals associated with the alert event. Moreover, graphical rendering 1502 may include animations, modified representation, and the like, of the different tactics and strategies employed by the alert event to further demonstrate to a SOC analyst the extent of the issues related to the security alert. Graphical render 1502 may also include different alert mappings 1504 for n devices that may require triage services. Moreover, server system 120 may further out a graphical rendering of other recommended triage steps including escalation steps, or comments for addressing the security threat, such as remotely shutting down the device in question, and the like. Moreover, the GUI of FIG. 15 enables an SOC analyst to monitor and triage multiple devices. For example, alerts 1504a, 1504b, . . . , 1504n. This provides for a more comprehensive and expedient triaging operation.

Figure 16:
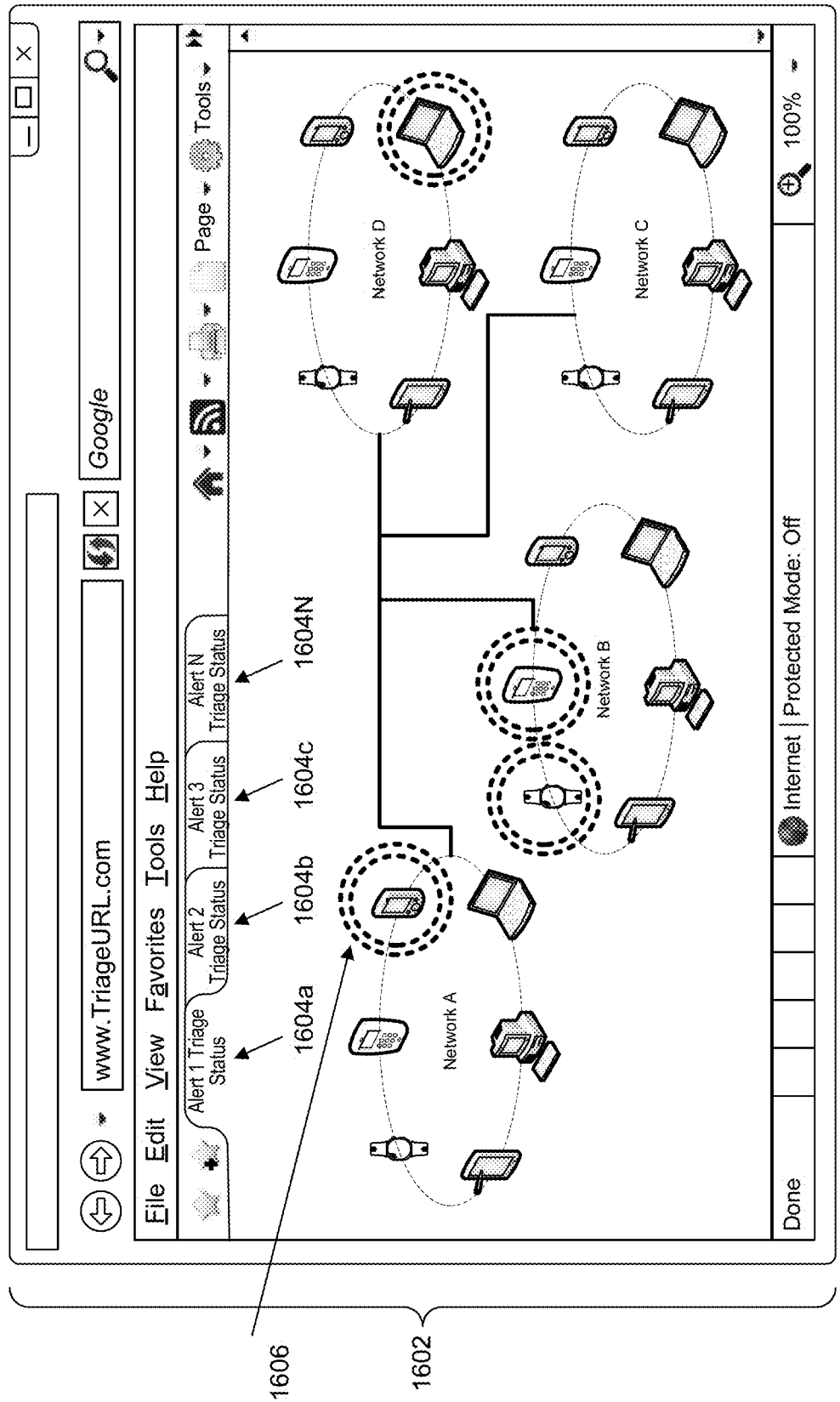
FIG. 16 illustrates a mapping of security alert and triage status within a network for different security threats, according to some embodiments.

FIG. 16 illustrates a mapping of security alert and triage status within a network for different security threats, in accordance with an exemplary embodiment. FIG. 16 includes a GUI representation 1602 of an entire network that may have alerts associated with certain networked devices. GUI 1602 may provide representation of the network nodes, types of nodes, and the type of alerts associated with the specific nodes. For example, GUI 1602 may provide a visual representation of a mobile device that is currently affected by alert 1604a. Moreover, GUI 1602 may include an animated representation of the triage effort 1606 currently being undertaken by the system. Such visual animation may include highlighting the mobile device, encircling it, and/or differentiating its representation with different color schemes, animations, and the like. This mapping also provides SOC analysts with representation of other devices that are under attack from the same malicious attack (i.e. associated with the same alert). While some attacks may focus on a specific device, others may be designed to bring down an entire network, or hack into multiple sensitive devices to extract information or penetrate the network. Accordingly, this visual representation provides the SOC analyst with information about what connected device is compromised, where the connected device is, and who does it belong to.

Moreover, the GUI of FIG. 16 enables an SOC analyst to monitor and triage multiple alerts. For example, alerts 1604a, 1604b, . . . , 1604n. This provides for a more comprehensive and expedient triaging operation.

It is an object of the present disclosure to help expedite a triage operation when encountering cyber-attacks. This may be achieved in three different manners. Initially, server 120 may be configured to sort through alerts and determine which alerts are true alerts representing a security threat, and which alerts are false positives or business as usual alerts. This is done through the contextual mapping activity described earlier.

Moreover, once an alert is generated, the system will gather all relevant "signal" events as well as relevant enrichment data. Together, the alert, signals, and enrichment data are fed to a machine learning model that provides both a numerical score and a recommended next action for the alert. The score conveys how confident the system is in the next action and the next action is meant to help the analyst understand what they should do (i.e. "Close as Benign", "Escalate to Incident Response", "Close as Mitigated", etc.). The alert, signals, numeric score, and recommendation are all rendered to the SOC user in a Case Management tool using various appropriate visualizations, including an event timeline. The renderings are designed to provide the analyst with all the context needed to make a decision and to obviate the need for the analyst to go searching through the raw event logs in order to manually find evidence of suspicious activity.

Moreover, the visual representation also alerts the SOC analyst of the potential breaches associated with the event. For example, as illustrated in FIG. 11, for example, executing a never seen before executable (1112) alone may not rise to the level of a malicious activity. However, together with the alert and the other related events, a SOC analyst can quickly determine the nature of the attack and what needs to be done to address it.

Additionally, server 120 also maps each activity to a related tactic and technique allows a SOC analyst to identify what the end goal of the malicious attack. In this regard, Server 120 may also provide a tactic/technique analysis report and a recommended response to counter the attack. This solution may be output on the GUI.

Moreover, server 120 also outputs a recommendation to the SOC analyst or preforms a predetermined triage function automatically once the alert is classified as a threat and mapped out. This may include isolating devices, local networks, or deploying other counter attack mechanisms.

These steps enable the expedited analysis of and response to malicious attacks on a given network. Moreover, the GUI supported by server 120 may display a variety of outputs all designed to allow a SOC analyst to better understand the problem at hand, and also how to best tackle the problem. The visual representation of the threat event, the related events, the classification and the tactic/technique representation greatly improve SOC analysts' ability to solve the problem of identifying and countering network security threats.

Exemplary embodiments of the present disclosure may be directed to a computer-implemented cyber-attack mitigation method, a cyber-attack mitigating apparatus, a non-transitory cyber-attack computer readable medium, and cyber-attack mitigating system. In one example, the method may include receiving, from one or more network devices tracking activity on a network, one or more data streams associated with a respective one of the one or more network devices; identifying a security alert from the one or more data streams, the security alert including metadata context describing the network device from the one or more network devices that originated the security alert; analyzing the metadata context; generating a metadata context score indicating a degree of deviation from a baseline representing normal activity; calculating an event sequence time window spanning a first time before the occurrence of the security alert and a second time after the occurrence of the security alert, the event sequence time window being based on the analyzed metadata context; generating a related activity score by correlating metadata of one or more events within the one or more data streams captured within the event sequence time window; classifying the type of the security threat event based on the related activity score and the metadata context score; and outputting a recommended mitigation course of action based on the classified type of the security threat event.

In the method, the outputting further includes displaying, on a graphical user interface (GUI), a timeline including the one or more events captured within the time window. The method may further include for respective events on the timeline, determining a device operational risk classification describing a category of tactic of a security threat, wherein the displaying further includes displaying the respective device operational risk classification associated with the security threat event. Moreover, the operational risk classification may include one of an operational risk, an execution risk, a delivery risk, a discovery risk, and a command and control risk.

The method may further include dynamically adjusting the size of the event sequence time window based on received updates of the metadata context.

The method may further include outputting the related activity, the metadata context, and the security threat event within the event sequence time window to a machine learning (ML) model; and adjusting identification of future security alerts.

The identifying of the security event may include determining a prevalence metric of the security event. The prevalence metric includes determining whether a host associated with the security alert interacted with a new or rare domain name, executed a new or rare EXE file, loaded a new or rare dynamic link library (DLL), or is determined to be communicating with a new or rare User-Agent. Identifying the security event may also include determining whether the host changed geographic locations within a predetermined time period.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A computer-implemented cyber-attack mitigation method comprising:
   receiving one or more data streams associated with one or more network devices;
   identifying a security alert from the one or more data streams, the security alert including metadata context describing a network device from the one or more network devices;
   measuring a baseline representing normal activity of the network device;
   generating a metadata context score by calculating a degree of deviation from the baseline;
   calculating an event sequence time window spanning the security alert;
   generating a related activity score by correlating metadata of one or more events within the one or more data streams captured within the event sequence time window, the correlating including analyzing a prevalence age of Uniform Resource Locators (URLs) accessed before and after the security alert and a detected change in a geographic location of the network device associated with the security alert;
   classifying a type of a security threat event based on the related activity score and the metadata context score; and
   outputting a recommended mitigation course of action based on the classified type of the security threat event.

2. The computer-implemented method according to claim 1, wherein the outputting further comprises:
   displaying, on a graphical user interface (GUI), a timeline including the one or more events captured within the event sequence time window.

3. The computer-implemented method according to claim 2, further comprising:
   for respective events on the timeline, determining a device operational risk classification describing a category of tactic of a security threat, wherein the displaying further includes displaying the respective device operational risk classification associated with the security threat event.

4. The computer-implemented method according to claim 3, wherein
   the device operational risk classification includes one of an operational risk, an execution risk, a delivery risk, a discovery risk, or a command and control risk.

5. The computer-implemented method according to claim 1, further comprising:
   dynamically adjusting the size of the event sequence time window based on received updates of the metadata context.

6. The computer-implemented method according to claim 1, further comprising:
   outputting the related activity score, the metadata context, and the security threat event within the event sequence time window to a machine learning (ML) model; and
   adjusting identification of future security alerts.

7. The computer-implemented method according to claim 1, further comprising:
   sizing the event sequence time window to span a first time before an occurrence of the security alert and a second time after the occurrence of the security alert, the sizing being based on the metadata context and spanning at least one or more events associated with the security alert.

8. The computer-implemented method according to claim 1, further comprising:
determining whether a host associated with the security alert interacted with a new or rare domain name, executed a new or rare EXE file, loaded a new or rare dynamic link library (DLL), or is determined to be communicating with a new or rare User-Agent.

9. A cyber-attack mitigating apparatus comprising:
circuitry configured to:
receive one or more data streams associated with one or more network devices,
identify a security alert from the one or more data streams, the security alert including metadata context describing a network device from the one or more network devices,
measure a baseline representing normal activity of the network device,
generate a metadata context score by calculating a degree of deviation from the baseline,
calculate an event sequence time window spanning the security alert,
generate a related activity score by correlating metadata of one or more events within the one or more data streams detected within the event sequence time window, wherein the correlating includes analyzing a prevalence metric of Uniform Resource Locators (URLs) accessed before and after the security alert and a detected change in a geographic location of the network device associated with the security alert,
classify a type of a security threat event based on the related activity score and the metadata context score, and
output a recommended mitigation course of action based on the classified type of the security threat event.

10. The apparatus according to claim 9, wherein the circuitry is further configured to:
display, on a graphical user interface (GUI), a timeline including the one or more events captured within the event sequence time window.

11. The apparatus according to claim 10, wherein the circuitry is further configured to:
for respective events on the timeline, determine a device operational risk classification describing a category of tactic of a security threat, and
display the respective device operational risk classification associated with the security threat event.

12. The apparatus according to claim 11, wherein
the device operational risk classification includes one of an operational risk, an execution risk, a delivery risk, a discovery risk, or a command and control risk.

13. The apparatus according to claim 9, wherein the circuitry is further configured to:
dynamically adjust the size of the event sequence time window based on received updates of the metadata context.

14. The apparatus according to claim 9, wherein the circuitry is further configured to:
output the related activity score, the metadata context, and the security threat event within the event sequence time window to a machine learning (ML) model, and
adjust identification of future security alerts.

15. The apparatus according to claim 9, further comprising:
sizing the event sequence time window to span a first time before an occurrence of the security alert and a second time after the occurrence of the security alert, the sizing being based on the metadata context and spanning at least one or more events associated with the security alert.

16. The apparatus according to claim 15, further comprising:
determining whether a host associated with the security alert interacted with a new or rare domain name, executed a new or rare EXE file, loaded a new or rare dynamic link library (DLL), or is determined to be communicating with a new or rare User-Agent.

17. A cyber-attack mitigating system comprising:
an apparatus comprising:
circuitry configured to:
receive one or more data streams associated with one or more network devices,
identify a security alert from the one or more data streams, the security alert including metadata context describing a network device from the one or more network devices,
measure a baseline representing normal activity of the network device,
generate a metadata context score by calculating a degree of deviation from the baseline,
calculate an event sequence time window spanning the security alert,
generate a related activity score by correlating metadata of one or more events within the one or more data streams detected within the event sequence time window, wherein the correlating includes analyzing a prevalence metric associated with the security alert and a detected change in a geographic location of the network device associated with the security alert,
classify a type of a security threat event based on the related activity score and the metadata context score, and
output a recommended mitigation course of action based on the classified type of the security threat event.

18. The system according to claim 17, wherein the circuitry is further configured to:
display, on a graphical user interface (GUI), a timeline including the one or more events captured within the event sequence time window.

19. The system according to claim 18, wherein the circuitry is further configured to:
determine a device operational risk classification describing a category of tactic of a security threat for respective events on the timeline, and
display the respective device operational risk classification associated with the security threat event.

20. The system according to claim 19, wherein the circuitry is further configured to:
display, on the GUI, a mapping of one or more devices having security alerts associated therewith, and
indicate, on the GUI, a triage status associated with each one of the one or more devices.

* * * * *